United States Patent [19]

Sato

[11] Patent Number: 5,748,966
[45] Date of Patent: May 5, 1998

[54] TYPE ERROR CHECKER FOR TYPE-FREE OR POLYMORPHIC COMPUTER LANGUAGE

[75] Inventor: Yoshikazu Sato, Urawa, Japan

[73] Assignee: The Trustees of the University of Pennsylvania, Philadelphia, Pa.

[21] Appl. No.: 366,894

[22] Filed: Dec. 30, 1994

[51] Int. Cl.$^6$ .............................. G06F 9/445; G06F 9/45
[52] U.S. Cl. ...................... 395/708; 395/705; 395/701
[58] Field of Search ..................................... 395/700, 701, 395/703, 704, 705, 707, 708, 650; 364/DIG. 1

[56] References Cited

U.S. PATENT DOCUMENTS

| 4,325,120 | 4/1982 | Colley et al. | 395/375 |
| 5,488,727 | 1/1996 | Agrawal et al. | 395/700 |
| 5,500,881 | 3/1996 | Levin et al. | 395/700 |

OTHER PUBLICATIONS

Hoang et al., "Standard ML-NJ Weak Polymorphism and Imperative Constructs," Dept. of Comp. Sci., Stanford Univ., CA, Proceedings of Eighth Annual IEEE Symposium on Logic in Computer Science, IEEE Computer Society Press, pp. 15–25, Jun. 19, 1993.

Plauger, Dave, "Making C + + Safe for Threads," C Users Journal, v11, n21, pp. 58–62, Feb. 1993.

Najork et al., "Enhancing Show–and–Tell with a Polymorphic Type System and Higher–Order Functions," Dept. of Comp. Sci., Illinois Univ., Urbana, IL, Proceedings of the 1990 IEEE Workshop on Visual Languages, IEEE Comp. Soc., pp. 215–220, Oct. 4, 1990.

Graves et al., "Common Intermediate Design Language," Software Tech. Center, Lockheed Palo Alto Res. Labs, Proceedings of the 25th Hawaii Int. Conf. on System Sciences, pp. 497–506, Jan. 7, 1992.

Aho et al., "Compilers Principles, Techniques, and Tools," Addison–Wesley Publishing, Reading, MA, 1986, Ch. 6 Type Checking, pp. 343–380.

A.W. Appel and D.B. MacQueen, "A Standard ML Compiler," In Proceedings of the Conference on Fuctional Programming and Computer Architecture, pp. 1–24. Springer–Verlag LNCS, 1987.

A.W. Appel and D.B. MacQueen, "A Standard ML of New Jersey," In M. Wirsing, editor, Symposium on Programming Language Implementation and Logic Programming, pp. 1–13, Springer–Verlag, 1991.

A. W. Appel, *Compiling with Continuations*, "Chapter Two: Continuation–Passing Style", pp. 11–22, Cambridge University Press, 1992.

H. Barendregt, "Lambda Calculi With Types," In S. Abramsky, D.M. Gabbay, and T.S.E. Maibaum, editors, Handbook of Logic in Theoretical Computer Science, vol. 2 Background: Computational Structures, pp.148–160, Oxford University Press, 1992.

(List continued on next page.)

*Primary Examiner*—Alvin E. Oberley
*Assistant Examiner*—Peter J. Corcoran, III
*Attorney, Agent, or Firm*—Woodcock Washburn Kurtz Mackiewicz & Norris LLP

[57] ABSTRACT

A system and method for a run-time type error in a program prior to running the program whose source code is written in a programming language with imperative constructs and polymorphic procedures is disclosed. To accomplish the above type error checking, the source code is translated into intermediate form representations by an intermediate form translator. In addition to the intermediate form representations, type representations which include predetermined types such as a locking type constructor and an unlocking type constructor are utilized in detecting the run-time type error. When both intermediate form representations and the type representations are used and the source code is determined to have no run-time type error prior to running the program according to the current invention, it is guaranteed that the program will run without any run-time type error.

65 Claims, 21 Drawing Sheets

OTHER PUBLICATIONS

L. Damas and R. Milner, "Principal Type-Schemes For Functional Programs," In Principles of Programming Languages, pp. 207-212, ACM, 1982.

C.A. Gunter, "Semantics of Programming Languages: Structures and Techniques," Foundations of Computing, Chapter 11: Parametric Polymorphism, The MIT Press, 1992.

M. Hoang, J.C. Mitchell, and R. Viswanathan; "Standard ML-NJ Weak Polymorphism and Imperative Constructs," In Proceedings of the Eighth Annual IEEE Symposium on Logic in Computer Sciences, pp. 15-25, IEEE Computer Society, 1993.

X. Leroy; "Polymorphism By Name for References and Continuations," In S.L. Graham, editor, Conference Record of the Twentieth Annual ACM SIGPLAN-SIGACT Symposium on Principles of Programming Languages, pp. 220-231, ACM, 1993.

X. Leroy and P., Weis, "Polymorphic Type Inference and Assignment," In Conference Record of the Eighteenth Annual ACM SIGPLAN-SIGACT Symposium on Principles of Programming Languages, pp. 291-302, ACM, 1991.

R. Milner and M. Tofte, "Commentary on Standard ML," Chapter 4: Static Semantics for the Core, The MIT Press, 1991, pp. 40-46.

R. Milner, M. Tofte, and R. Harper, "The Definition of Standard ML," Chapter 2: Syntax of the Core, The MIT Press, 1990, pp. 3-30.

R. Milner; "A Theory of Type Polymorphism in Programming," Journal of Computer and System Sciences, 17:348-375; 1978.

J.C. Mitchell, "Types Systems for Programming Languages," In J. van Leeuwen, editor, Handbook of Theoretical Computer Science, pp. 444-453, North-Holland, 1990.

David Schmidt, "Denotational Semantics: A Methodology for Language Development," Chapter 8: Abstraction, Correspondence, and Qualification, Allyn and Bacon, 1986, pp. 174-185.

David Schmidt; "The Structure of Typed Programming Languages," Foundations of Computing, Chapter 7: Functional Programming Languages, pp. 203-233, The MIT Press, 1994.

J. E. Stoy, "Denotational Semantics: The Scott-Strachey Approach to Programming Language Semantics," Chapter 5: The $\lambda$-Calculus, pp. 52-77, The MIT Press, 1977.

J.P. Talpin, and P. Jouvelot, "The Type and Effect of Discipline," In Proceedings of the Seventh Annual IEEE Symposium on Logic in Computer Science, pp. 162-173, IEEE Computer Society, 1992.

Mads Tofte; "Operational Semantics and Polymorphic Type Interference," Ph.D. thesis, University of Edinburgh, Edinburgh, Scotland, 1987.

Mads Tofte, "Type Inference For Polymorphic References," Information and Computation, 89:1-34, 1990.

Glynn Winskel, "The Formal Semantics of Programming Languages," Foundations of Computing, Chapter 11: Languages with higher types, pp. 183-201, The MIT Press, 1993.

A.K. Wright and M. Felleisen; "A Syntactic Approach to Type Soundness," Technical Report COMP TR91-160, Department of Computer, Rice University, 1991.

A.K. Wright, "Polymorphism for Imperative Languages Without Imperative Types," Technical Report COMP TR93-200, Department of Computer, Rice University, 1993.

Yoshikazu Sato, "A Theory of Type Polymorphism in Imperative Programming," Master thesis, University of Pennsylvania, Philadelphia, Pennsylvania, 1994.

Plauger, Dave, "Making ++ Safe for Threads," *C User's Journal*, Feb. 1993.

Najork et al., "Enhancing Show-and-Tell with a Polymorphic Type System and Higher-Order Functions," *IEEE Computer Society Press, Dept. of Comp. Sci., Illinois Univ., Ubana, IL,* Oct. 4, 1990, pp. 215-220.

Graves et al., "Common Intermediate Design Language," *IEEE Proceedings of the 25th Hawii Int. Conf. on System Sciences, Software Tech. Center, Lockheed Palo Alto Research Labs,* Jan. 7, 1992, pp. 497-506.

INTERMEDIATE FORM REPRESENTATION

FIG. 5
TYPE REPRESENTATION
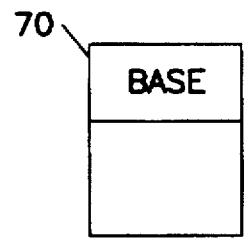
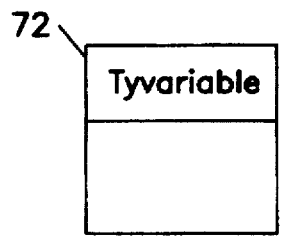
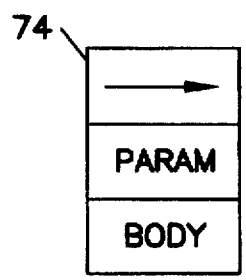
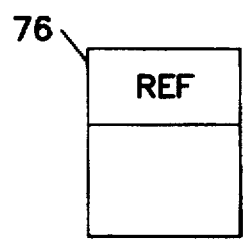
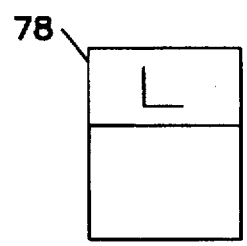
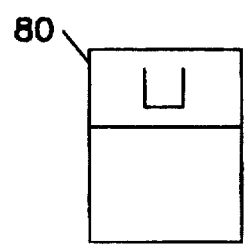

TYPE REPRESENTATION
CONSTENT + : INT ⟶ ( INT ⟶ INT )

$(L[\alpha \rightarrow \alpha])$ REF

TypeOf(C)

TableOf Table (given)

A(x)

(A ≡ {x₁:T₁ x₂:T₂ --- xₙ:Tₙ})

TWL(M,A)

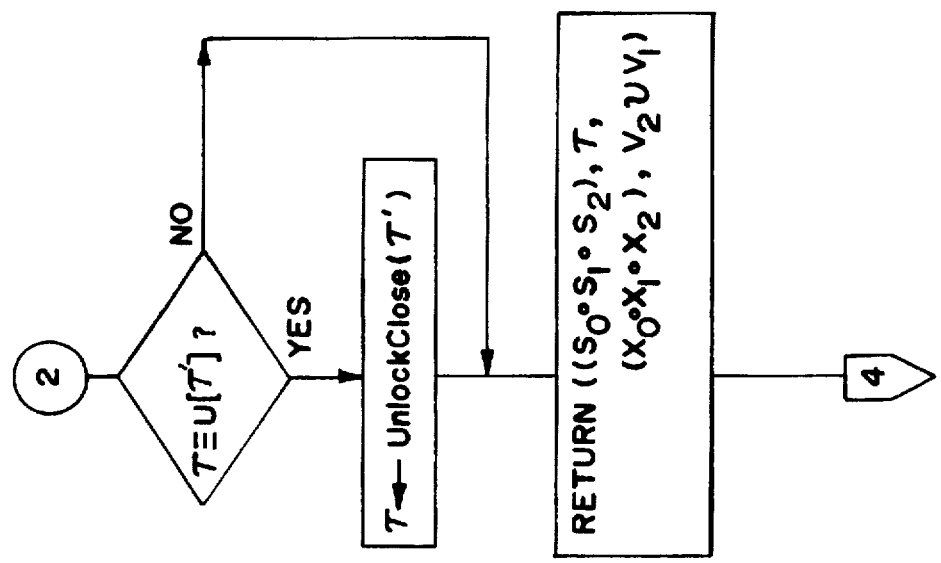
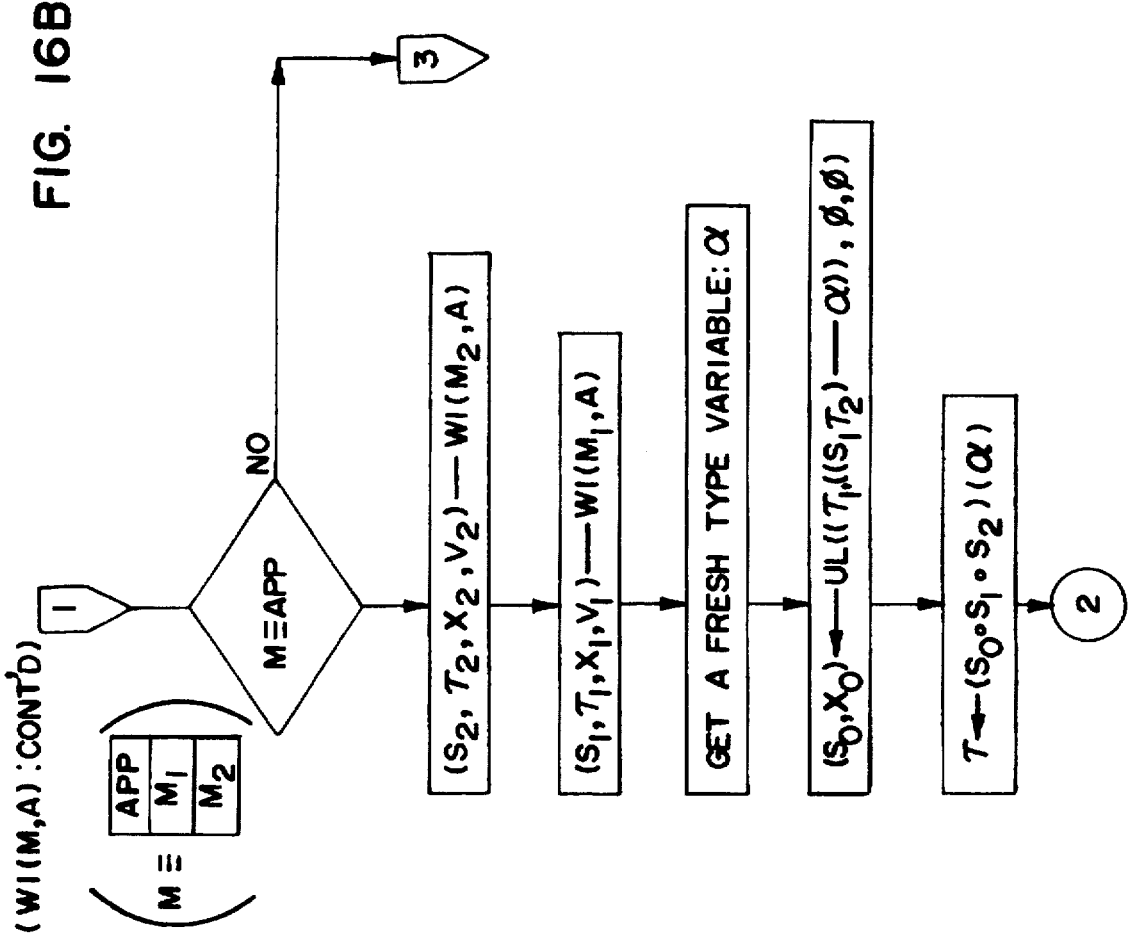
FIG. 16B

WI(M,A) CONT'D

FIG. 17B
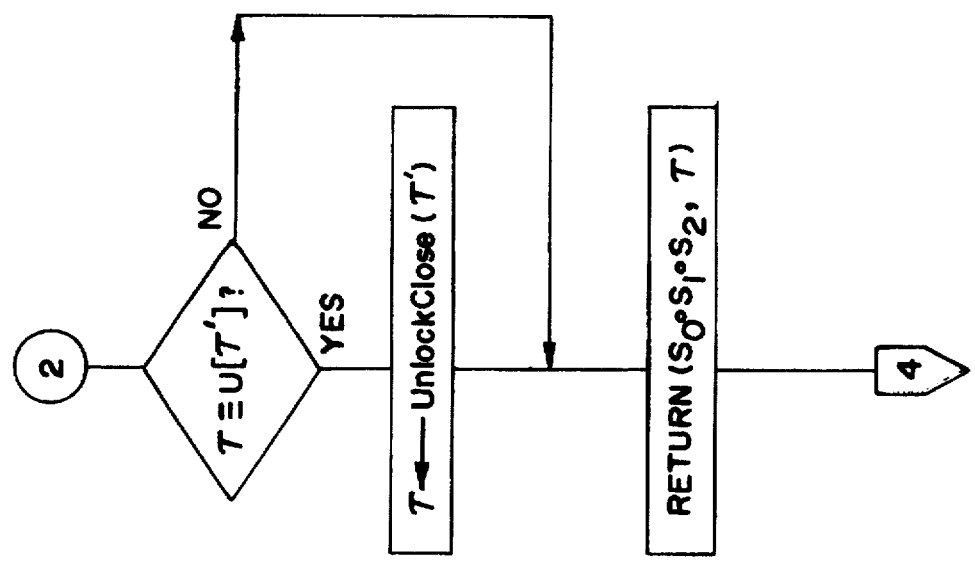
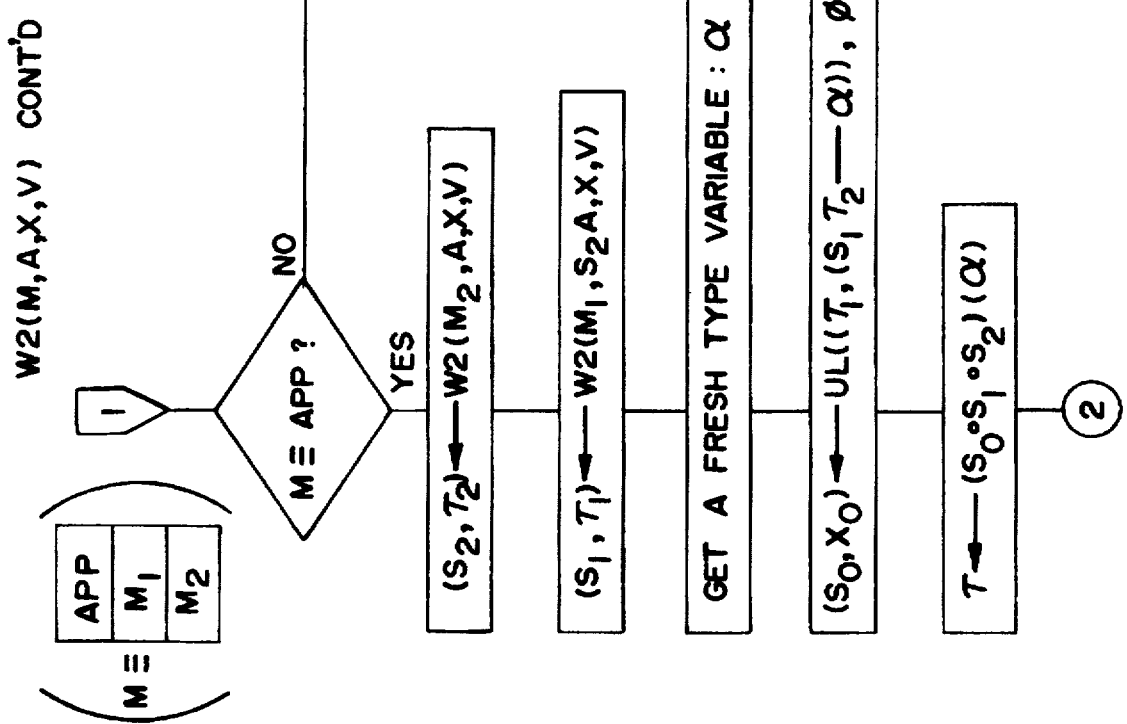

| | | | |
|---|---|---|---|
| U-I | $UL(\emptyset, S, X)$ | $\longrightarrow$ | $(S, X)$ |
| U-II | $UL(G \cup \{(\tau \simeq \tau)\}, S, X)$ | $\longrightarrow$ | $UL(G, S, X)$ |
| U-III | $UL(G \cup \{(\tau_{11} \to \tau_{12}$ $\simeq \tau_{21} \to \tau_{22})\}, S, X)$ | $\longrightarrow$ | $UL(G \cup \{(\tau_{11} \simeq \tau_{21}), (\tau_{12} \simeq \tau_{22})\}, S, X)$ |
| | $UL(G \cup \{(\tau_1\, ref \simeq \tau_2\, ref)\}, S, X)$ | $\longrightarrow$ | $UL(G \cup \{(\tau_1 \simeq \tau_2)\}, S, X)$ |
| | $UL(G \cup \{(\mathcal{L}[\tau_1] \simeq \mathcal{L}[\tau_2])\}, S, X)$ | $\longrightarrow$ | $UL(G \cup \{(\tau_1 \simeq \tau_2)\}, S, X)$ |
| | $UL(G \cup \{(\mathcal{U}[\tau_1] \simeq \mathcal{U}[\tau_2])\}, S, X)$ | $\longrightarrow$ | $UL(G \cup \{(\tau_1 \simeq \tau_2)\}, S, X)$ |
| U-IV | $UL(G \cup \{(\mathcal{U}[\tau_1] \simeq \mathcal{L}[\tau_2])\}, S, X)$ | $\longrightarrow$ | $UL(G \cup \{(\tau_1 \simeq \mathcal{L}[\tau_2])\}, S, X)$ |
| | $UL(G \cup \{(\mathcal{L}[\tau_1] \simeq \mathcal{U}[\tau_2])\}, S, X)$ | $\longrightarrow$ | $UL(G \cup \{(\mathcal{U}[\tau_1] \simeq \mathcal{L}[\tau_2])\}, S, X)$ |
| U-V | $UL(G \cup \{(\alpha^\emptyset \simeq \mathcal{L}^n[\beta^\emptyset])\}, S, X)$ | $\longrightarrow$ | $UL(G, S, X)$  if $\alpha^\emptyset = \beta^\emptyset$ |
| | | | $UL(G, S \cup \{(\alpha^\emptyset \mapsto \mathcal{L}^n[\beta^\emptyset])\}, X)$  if $\alpha^\emptyset \neq \beta^\emptyset$ |
| | $UL(G \cup \{(\alpha^\emptyset \simeq \mathcal{L}^n[\beta^A])\}, S, X)$ | $\longrightarrow$ | $UL(G, S \cup \{(\alpha^\emptyset \mapsto \mathcal{L}^n[\beta^A])\}, X)$ if $\alpha^\emptyset \notin FTV(A)$ |
| | | | $UL(G, S \cup \{(\beta^A \mapsto \alpha^\emptyset)\},$ $X \cup \{(\beta^A \mapsto \alpha^\emptyset)\})$  if $\alpha \in FTV(A)$ |
| | $UL(G \cup \{(\alpha^A \simeq \mathcal{L}^n[\beta^\emptyset])\}, S, X)$ | $\longrightarrow$ | $UL(G, S \cup \{(\beta^\emptyset \mapsto \alpha^A)\}, X)$  if $\beta^\emptyset \notin FTV(A)$ |
| | | | $UL(G, S \cup \{(\alpha^A \mapsto \mathcal{L}^n[\beta^\emptyset])\},$ $X \cup \{(\alpha^A \mapsto \mathcal{L}^n[\beta^\emptyset])\})$  if $\beta^\emptyset \in FTV(A)$ |
| | $UL(G \cup \{(\alpha^{A_1} \simeq \mathcal{L}^n[\beta^{A_2}])\}, S, X)$ | $\longrightarrow$ | $UL(G, S, X)$  if $\alpha^{A_1} = \beta^{A_2}$ |
| | | | $UL(G, S \cup \{(\alpha^{A_1} \mapsto \mathcal{L}^n[\beta^{A_2}])\},$ $X \cup \{(\alpha^{A_1} \mapsto \mathcal{L}^n[\beta^{A_2}])\})$  if $A_2 \subseteq A_1$ |
| | | | $UL(G, S \cup \{(\beta^{A_2} \mapsto \alpha^{A_1})\},$ $X \cup \{(\beta^{A_2} \mapsto \alpha^{A_1})\})$  if $A_1 \subset A_2$ |
| | $UL(G \cup \{(\tau \simeq \mathcal{L}^n[\alpha^\emptyset])\}, S, X)$ | $\longrightarrow$ | $UL(G, S \cup \{(\alpha^\emptyset \mapsto Lock^n(\tau))\}, X)$ |
| | $UL(G \cup \{(\tau \simeq \mathcal{L}^n[\alpha^A])\}, S, X)$ | $\longrightarrow$ | $UL(G, S \cup \{(\alpha^A \mapsto \tau)\}, X \cup \{(\alpha^A \mapsto \tau)\})$ |
| | $UL(G \cup \{(\tau_1 \simeq \mathcal{L}[\tau_2])\}, S, X)$ | $\longrightarrow$ | $UL(G \cup \{(\tau_1 \simeq Lock(\tau_2))\}, S, X)$ |
| | $UL(G \cup \{(\mathcal{L}[\tau_1] \simeq \tau_2)\}, S, X)$ | $\longrightarrow$ | $UL(G \cup \{(\tau_2 \simeq \mathcal{L}[\tau_1])\}, S, X)$ |
| U-VI | $UL(G \cup \{(\alpha^\emptyset \simeq \mathcal{U}^n[\beta^\emptyset])\}, S, X)$ | $\longrightarrow$ | $UL(G, S, X)$  if $\alpha^\emptyset = \beta^\emptyset$ |
| | | | $UL(G, S \cup \{(\alpha^\emptyset \mapsto \mathcal{U}^n[\beta^\emptyset])\}, X)$  if $\alpha^\emptyset \neq \beta^\emptyset$ |
| | $UL(G \cup \{(\alpha^\emptyset \simeq \mathcal{U}^n[\beta^A])\}, S, X)$ | $\longrightarrow$ | $UL(G, S \cup \{(\alpha^\emptyset \mapsto \mathcal{U}^n[\beta^A])\}, X)$ if $\alpha^\emptyset \notin FTV(A)$ |
| | | | $UL(G, S \cup \{(\beta^A \mapsto \alpha^\emptyset)\},$ $X \cup \{(\beta^A \mapsto \alpha^\emptyset)\})$  if $\alpha^\emptyset \in FTV(A)$ |
| | $UL(G \cup \{(\alpha^A \simeq \mathcal{U}^n[\beta^\emptyset])\}, S, X)$ | $\longrightarrow$ | $UL(G, S \cup \{(\beta^\emptyset \mapsto \alpha^A)\}, X)$  if $\beta^\emptyset \notin FTV(A)$ |
| | | | $UL(G, S \cup \{(\alpha^A \mapsto \mathcal{U}^n[\beta^\emptyset])\},$ $X \cup \{(\alpha^A \mapsto \mathcal{U}^n[\beta^\emptyset])\})$  if $\beta^\emptyset \in FTV(A)$ |
| | $UL(G \cup \{(\alpha^{A_1} \simeq \mathcal{U}^n[\beta^{A_2}])\}, S, X)$ | $\longrightarrow$ | $UL(G, S, X)$  if $\alpha^{A_1} = \beta^{A_2}$ |
| | | | $UL(G, S \cup \{(\alpha^{A_1} \mapsto \mathcal{U}^n[\beta^{A_2}])\},$ $X \cup \{(\alpha^{A_1} \mapsto \mathcal{U}^n[\beta^{A_2}])\})$  if $A_2 \subseteq A_1$ |
| | | | $UL(G, S \cup \{(\beta^{A_2} \mapsto \alpha^{A_1})\},$ $X \cup \{(\beta^{A_2} \mapsto \alpha^{A_1})\})$  if $A_1 \subset A_2$ |
| | $UL(G \cup \{(\tau \simeq \mathcal{U}^n[\alpha^\emptyset])\}, S, X)$ | $\longrightarrow$ | $UL(G, S \cup \{(\alpha^\emptyset \mapsto \tau)\}, X)$ |
| | $UL(G \cup \{(\tau \simeq \mathcal{U}^n[\alpha^A])\}, S, X)$ | $\longrightarrow$ | $UL(G, S \cup \{(\alpha^A \mapsto \tau)\}, X \cup \{(\alpha^A \mapsto \tau)\})$ |
| | $UL(G \cup \{(\tau_1 \simeq \mathcal{U}[\tau_2])\}, S, X)$ | $\longrightarrow$ | $UL(G \cup \{(\tau_1 \simeq \tau_2)\}, S, X)$ |
| | $UL(G \cup \{(\mathcal{U}[\tau_1] \simeq \tau_2)\}, S, X)$ | $\longrightarrow$ | $UL(G \cup \{(\tau_2 \simeq \mathcal{U}[\tau_1])\}, S, X)$ |
| U-VII | $UL(G \cup \{(\alpha^\emptyset \simeq \tau)\}, S, X)$ | $\longrightarrow$ | $UL(G, S \cup \{(\alpha^\emptyset \mapsto \tau)\}, X)$ |
| | | | if $\alpha^\emptyset \notin FTV(\tau)$ and $\alpha^\emptyset \notin dom(S)$ |
| | $UL(G \cup \{(\alpha^A \simeq \tau)\}, S, X)$ | $\longrightarrow$ | $UL(G, S \cup \{(\alpha^A \mapsto \tau)\}, X \cup \{(\alpha^A \mapsto \tau)\})$ |
| | | | if $\alpha^A \notin FTV(\tau)$ and $\alpha^A \notin dom(S)$ |
| | $UL(G \cup \{(\tau \simeq \alpha^\emptyset)\}, S, X)$ | $\longrightarrow$ | $UL(G \cup \{(\alpha^\emptyset \simeq \tau)\}, S, X)$ |
| | $UL(G \cup \{(\tau \simeq \alpha^A)\}, S, X)$ | $\longrightarrow$ | $UL(G \cup \{(\alpha^A \simeq \tau)\}, S, X)$ |
| U-VIII | $UL(\_, \_, \_)$ | $\longrightarrow$ | fail |

TYPE ERROR CHECKER FOR TYPE-FREE OR POLYMORPHIC COMPUTER LANGUAGE

FIELD OF THE INVENTION

The current invention is generally related to a run-time type error checking and particularly related to the detection of run-time type errors prior to running a program written in a programming language with imperative features and polymorphic features.

BACKGROUND OF THE INVENTION

Computers execute commands as described in a program. If the description contains some mistake, the computer strictly tries to execute the mistake, resulting in its unpredictable behavior. This result known as bugs of a program, is painfully familiar to not only any programmers but also any computer users who have seen strange messages from a computer such as "INTERNAL ERROR DETECTED" or "PANIC! ERROR CODE: 13." Due to bugs of a program, a computer may cause some serious damage by destroying important data or not completing the intended operation.

Among the above-described computer errors or bugs, "type errors" are one kind of fatal errors to computer operation. To understand what type errors are, we will consider two simple exemplary functions: add(x,y) which computes x+y, and concatenate(x,y) which concatenates two strings into one string. If a program contains add (3,5), then a computer can add the two integers, returning 8 as the result. If another program contains concatenate("abc", "xyz"), then a computer can concatenate the two strings into "abcxyz." Now, what will happen if a program contains add(3, "abc") or concatenate("abc", 5)? Since these computations do not make any sense, they are considered as type errors. However, if a computer strictly tries to execute these undefined computations, the result is at best unpredictable. The type errors are more formally defined as follows: A type-error occurs when the formal parameter of a function does not agree with the actual arguments. This definition has at least three different contexts. The first context includes a mismatch in "kind" between a formal parameter and an actual argument. Still using the above examples, since the function add is defined to have formal parameters of two integers, an integer and a string as actual arguments cause a type error.

The second context of type errors occurs when the number of formal parameters does not match with the number of actual arguments. Using the above example, since the function concatenate is defined to have formal parameters of two strings, if only one string is used as an actual argument, this mismatch in "number" also causes a type error. Lastly, the third context of type errors occurs when a "reference" does not match. For example, when the reference is made through a pointer, the pointer is misused to point to a data element that is not supposed to point. Another example includes a situation when an out of an array data element is accessed or updated. These and the above-described unexpected or mismatched types in "kind," "number" and "reference" are all characterized as type errors.

Type errors can be detected prior to running a program by statically analyzing the program. However, unlike the above examples, the detection is not so simple because programs usually contain variables. For example, if a program contains the above-defined function add (3,x), we cannot say whether this expression has an error or not until x contains some value. When x contains a string such as "abc", the expression has a type error. On the other hand, when x contains an integer such as 3, the expression does not have a type error. Since a value in the x is not known before execution, we cannot detect the type error without executing the program.

To handle this situation, many programming languages require programmers to declare types of variables in advance. For instance, x:int declares that x is an integer variable. Referring to the declaration, add(3,x) will be legal, while concatenate("abc",x) will be a type error because x does not have a string type. By the same token, if all the types of variables, parameters, functions, or procedures in a program are declared, the type errors of the program are checked prior to running the program. In other words, any program that passes this check will never cause type errors at runtime.

Polymorphism

Despite the above-described nicety of the type declaration approach, there is a need for avoiding advance type declaration in a certain segment of the computer programming field. Although complete declaration detects all the type errors, this approach is not convenient for programmers who want to write a generic function, which works well on objects of a wide variety of types. This need is elucidated by considering a function swap, which takes a pair of values and simply swaps them. The function can be defined as swap (x,y)=(y,x). Thus, the function swap(3,5) will return (5,3). Similarly, the function swap ("abc", "xyz") or swap (3, "xyz"), respectively, will return ("xyz", "abc") and ("xyz", 3). This exemplary function needs to be type neutral or generic type.

Without the type neutrality, the above function swap must be declared with all the types of variables for any type of combination of parameters. These combinations of the advance type definition of the function include swap(x:int, y:int)=(y,x) for an integer swap, swap(x:string, y:string)=(y, x) for a string swap, swap(x:int, y:string)=(y,x) for an integer-string swap, swap(x:string, y:int)=(y,x) for a string-integer swap, and etc. Obviously, the number of strictly typed combinations increases $2^n$ as the number of n types to parameters is swapped in this series of functions.

Thus, under certain circumstances, the strict advance type declaration is not desirable, and a type neutral or generic type approach is necessary.

In summary, it is the current state of computer programming that if one of ordinary skill in the art wants to detect type errors statically and completely with strict advance type declaration, he or she cannot write generic functions. On the other hand, if one of ordinary skill in the relevant art wants to write generic functions, he or she cannot statically detect type errors. This dilemma between advance type declaration for run-time safety and a generic type capability for efficient programming has presented an unsolved problem in the field of computer programming.

To attempt to solve this dilemma, Milner has proposed an algorithm W [R. Milner; "A Theory of Type Polymorphism in Programming," Journal of Computer and System Sciences, 17:348–375; 1978]. External references are herein incorporated by reference as if set forth fully herein. Without complete type declaration, the algorithm can infer their types. The inference is made by analyzing a program.

Moreover, the inferred types are proved to be principal typing [L. Damas and R. Milner, "Principal Type-Schemes For Functional Programs," In Principles of Programming Languages, pages 207–212, ACM, 1982.]. In the above examples, the functions add and concatenate would get types (int * int)→int and (string * string)→string, respectively, by analyzing their function bodies, which were not specified here. On the other hand, the function swap gets a type (α* β)→(β* α), where α and β are called type variables and they can be replaced to some specific types at each usage of the function swap. In other words, the function swap is regarded to have a type "taking a pair of values of some types α and β, and returning a pair of values of the types β and α." These general types are called polymorphic types, while usual types, or not polymorphic types, are called monomorphic types.

To understand how polymorphic types are inferred, the following example is provided using ML, a functional programming language:

```
let fun id(x) = x
in id(1);
    id("abc")
end
```

In this example, on the first line, an identity function id is defined. On the second line, the id is used with integer argument 1. At this point, a computer will return 1. On the third line, the id is used with a string argument "abc." At this point, the computer will return "abc". From a viewpoint of polymorphic types, an ML compiler infers id: α →α at the first line. The type variable α is regarded as int at the second line and string at the third line. Here, the function id is polymorphic, namely, the function handles more than one type. However, as will be described later, the above Milner's polymorphic type discipline fails with imperative features which usually include referencing operations such as assignment statements and control statements such as nonlocal jump statements [R. Milner; "A Theory of Type Polymorphism in Programming." Journal of Computer and System Sciences, 17:348–375; 1978].

Polymorphic Reference Problem

To understand the failure in referencing operations, the referencing operations using ML are illustrated in FIG. 1. To support referencing operations, ML provides three primitive functions: ref, !, and := . Operator ref, which has a type α→α ref creates and returns a reference cell 20, referring to a first value 22 given as an argument. Operator !, which has a type α ref→α, returns the first value 22 referred through the reference cell 20 given as an argument. Operator := , which has a type (α ref * α)→unit, takes the reference cell 20 as the first argument and a second value 24 as the second argument, and updates the contents of the reference cell 20 so that it refers to the second value 24 of the second argument. Here is an example program using the above-described referencing operations:

```
let fun addone(x) = x+1
    fun addtwo(x) = x+2
    val fp = ref (addone)
in  !fp(1);     (* 1+1 -> 2 *)
    fp := addtwo;
            (* changing the function referred by fp
*)
    !fp(2)   (* 2+2 -> 4*)
end
```

First and second lines define two simple functions addone and addtwo. Third line defines a reference cell named fp, which refers to the function addone. Next, in the body of let-expression, the value of the reference cell is taken out, and given an integer argument 1. At this point, a computer will execute 1+1. After the cell is modified to refer to addtwo function with the assignment statement on the fifth line, the value of the cell is taken out again, and given an integer argument 2. At this point, the computer will execute 2+2. From a viewpoint of a type inference, both addone and addtwo are regarded to have a type int→int. The fp has a type (int→int) ref. Thus, in the body of let-expression, since the fp is used with integer based types, whole program has no type errors.

In contrast to the above referencing operations, the Milner style polymorphic type discipline fails with a particular assignment operation as shown in the following:

```
let fun id(x) = x
    fun addone(x) = x+1
    val fp = ref (id)
    in !fp("abc");(* "abc" -> "abc" *)
    fp : = addone;
            (* changing the function referred by fp *)
    !fp("xyz") (* "xyz"+1 -> ???? *)
end
```

The first and second lines define two simple functions id and addone. The third line defines a reference cell, named fp, which refers to the function id. Next, in the body of let-expression, the value of the reference cell is taken out, and given a string argument "abc." At this point, a computer will return "abc". After the cell is modified to refer to addone function with the assignment statement on the fifth line, the value of the cell is taken out again and is given a string argument "xyz". At this point, the computer will try to execute "xyz"+1, which is a run-time type error. This run-time type error is not detected by the type inference since id gets a type α→α, and addone gets a type int→int. The fp has a type (α→α) ref. In the body of let-expression, a is regarded as string, int and string in this order. Therefore, W despite its typechecking does not detect the above runtime type error.

The above run-time polymorphic referencing problem seems to originate from mutuality of imperative features of programming languages. That is, an assignment statement or a nonlocal jump statement changes internal state of a computer. However, Milner's W does not care about the mutuality. Concretely speaking, in ML-style referencing, a dereferencing (!) operation takes out the value that is just previously stored through an assignment (:=) operation. This means that the dereferencing operation depends on the assignment operation, and the type variable a is independently replaced to int or string. Therefore, due to the instantiation of a polymorphic type variable by independent assignments, W cannot prevent the runtime type error.

In pure functional programming languages, or applicative languages, we do not have to deal with this problem. Since a value returned by a mathematical function is permanently fixed, or independent from the order of a computation or internal states of a computer, the returned value is always the same. For instance, let y=f(x) be a mathematical function and f(2) be 10. Assuming this to be computed on a computer, the computation always returns 10, which is independent from a computer or an order of the computation. However, seeing an operation ! to be a function, the computation !x taking out a value referred by x, is not fixed because it depends on a previously executed assignment statement.

Prior Attempts

To visualize the above-described problems associated with mutuality of the imperative features of the programming languages, it may be considered that pure functional programs consist only of isolated points or values, while imperative programs consist of mutual points that are connected with lines for execution order. By further visualizing the above analogy, the connecting lines may be considered as tunnels which, under certain circumstances, allow an entry of a monomorphic type and prevents the entry of a polymorphic type. Under this restricted situation, the tunnels may be considered as monomorphic tunnels. In relating to ML-style referencing operations, an entrance of the tunnels is a reference creation operator ref, an exit of the tunnels is a dereferencing operator !. There is a special operator :=, which forces the tunnels to be monomorphic. In this tunnel metaphor, a solution to the above- described mutuality problem of polymorphic types is to prevent a value that has a polymorphic type from entering a monomorphic tunnel.

In the following discussion of prior attempts, some knowledge of (typed) lambda-calculus, formal semantics of programming languages and functional programming languages, especially ML at the level known to one of ordinary skill in programming are assumed. In addition, J. E. Stoy, "Denotational Semantics: The Scott-Strachey Approach to Programming Language Semantics," The MIT Press, 1977; David Schmidt, "Denotational Semantics: A Methodology for Language Development," Allyn and Bacon, 1986; David Schmidt; "The Structure of Typed Programming Languages," Foundations of Computing, The MIT Press, 1994; J. C. Mitchell, "Types Systems for Programming Languages," In J. van Leeuwen, editor, Handbook of Theoretical Computer Science, pp. 365–458, North-Holland, 1990; H. Barendregt, "Lambda Calculi With Types," In S. Abramsky, D. M. Gabbay, and T. S. E. Maibaum, editors, Handbook of Logic in Theoretical Computer Science, Volume 2 Background: Computational Structures, pp. 117–310, Oxford University Press, 1992; C. A. Gunter, "Semantics of Programming Languages: Structures and Techniques," Foundations of Computing, The MIT Press, 1992; and Glynn Winskel, "The Formal Semantics of Programming Languages," Foundations of Computing, The MIT Press, 1993; are herein incorporated into the current application by external reference.

Imperative type [Mads Tofte; "Operational Semantics and Polymorphic Type Interference," Ph.D. thesis, University of Edinburgh, Edinburgh, Scotland, 1987; Mads Tofte, "Type Inference for Polymorphic References," Information and Computation, 89:1–34, 1990; A. K. Wright and M. Felleisen; "A Syntactic Approach to Type Soundness," Technical Report COMP TR91-160, Department of Computer, Rice University, 1991; R. Milner, M. Tofte, and R. Harper, "The Definition of Standard ML," The MIT Press, 1990; R. Milner and M. Tofte, "Commentary on Standard ML," The MIT Press, 1991] is proposed by Tofte [Mads Tofte; "Operational Semantics and Polymorphic Type Interference," Ph.D. thesis, University of Edinburgh, Edinburgh, Scotland, 1987; Mads Tofte, "Type Inference for Polymorphic References," Information and Computation, 89:1–34, 1990], and adopted in the definition of Standard ML [R. Milner, M. Tofte, and R. Harper, "The Defintiion of Standard ML," The MIT press, 1990; R. Milner and M. Tofte, "Commentary on Standard ML," The MIT Press, 1991]. The central idea of this solution is to ensure that the only monomorphically used values are stored. Based upon this restriction, type variables are partitioned into applicative (ordinary) type variables ($\alpha, \beta, \ldots$), and imperative ones ($\underline{\alpha}, \underline{\beta}, \ldots$). Only values of imperative type are stored. When imperative type variables are replaced to some specific types, the specific type cannot have any free type variables in its representation. Using the imperative type variable, a referencing operation ref is typed as $\underline{\alpha} \rightarrow \underline{\alpha}$ ref. Under this attempt, the previously used example is treated as follows:

```
let  fun id(x) = x
     fun addone(x) = x+1
     val fp = ref (id)
in   !fp("abc");(* "abc" -> "abc" *)
     fp = addone;
     (* changing the function referred by fp *)
     !fp("xyz") (* "xyz"+1 -> ??? *)
end
```

A type ($\alpha \rightarrow \alpha$) ref cannot be assigned to fp on the third line because this typing violates the restriction of imperative type variables. Note that ref has a type $\underline{\alpha} \rightarrow \underline{\alpha}$ ref. As a result, fp gets a type (string→string) ref on the fourth line, while it gets a type (int→int) ref on the fifth line. Therefore, we can statically detect the type error.

Speaking in terms of the tunnel metaphor, this solution based upon imperative type checks at the entrance of the tunnel whether a value has a polymorphic type or not. If it does, this solution rejects the entire program to prevent the polymorphic value from entering the tunnel.

Weak type [M. Hoang, J. C. Mitchell, and R. Viswanathan; "Standard ML-NJ Weak Polymorphism and Imperative Constructs," In Proceedings of the Eighth Annual IEEE Symposium on Logic in Computer Sciences, pages 15–25, IEEE Computer Society, 1993] technique is adopted in Standard ML of New Jersey [A. W. Appel and D. B. MacQueen, "A Standard ML Compiler," In Proceedings of the Conference on Functional Programming and Computer Architecture, pp. 301–324, Springer-Verlag LNCS, 1987; A. W. Appel and D. B. MacQueen, "A Standard ML of New Jersey," In M. Wirsing, editor, Symposium on Programming Language Implementation and Logic Programming, pp. 1–13, Springer-Verlag, 1991; A. Appel, "Compiling with Continuations," Cambridge University Press, 1992], which is one of the most popular and efficient implementations of Standard ML. This solution, considered a natural extension of imperative type, introduces weak type variables with weakness in lieu of imperative type variables. The weakness which is represented by an integer value reflects a degree of undesirability for program execution. When the weakness becomes zero in a type of an expression, the expression is dangerously close to create a reference cell containing free type variables in its type representation. For example, consider a lambda expression:

$$fn\ x=\rightarrow fn\ y=\rightarrow ref\,[x,y]$$

which is a higher order function, taking two arguments x and y in this order and returning a cell referring to a list of the two elements x and y. The expression gets a type $2\alpha \rightarrow 2\alpha \rightarrow 2\alpha$ list ref in weak type. Furthermore, by letting the expression be M, consider an expression (M nil) or a more familiar expression might be M (nil). Despite the fact that nil has a type a list where $\alpha$ is a free type variable, this expression is still safe because it does not yet create a fatal polymorphic reference cell and is considered the same expression as fn y=→[nil ,y], which has a type $\underline{\alpha}$ list→$\underline{\alpha}$ list ref of imperative type. In weak polymorphism, the expression (M nil) gets a type $1\alpha$ list→$1\alpha$ list ref. Note that the weakness now decreases from two to one. Speaking in terms of the tunnel metaphor, this "weak type" solution checks at the exact entrance of the tunnel whether a value has a polymorphic type or not. If it does, this solution rejects the program to prevent the polymorphic value from entering the tunnel.

The above two solutions have a tradeoff as Tofte originally pointed out—when we implement a polymorphic function using referencing operations, the function cannot get an unannotated polymorphic type due to the limitation of imperative or weak type variables. This restriction will cause a problem in handling the following example of a function imperative_reverse, which reverses a list given as an argument:

```
fun imperative_reverse 1 =
    let val   a = ref 1 and
              b = ref nil
    in while (not (null (a))) do
         (b := head(!a)::(!b);
          a := tail (a));
       !b
    end
``` where : : is a list augmenting operator of the type α * α→α list. This function gets a type α list→α list or 1α list→1α list because the operation ref's are used at second and third lines [R. Milner and M. Tofte, "Commentary on Standard ML," The MIT Press, 1991, pages 45]. Therefore, the function cannot be used to reverse a list whose element type contains free type variables. For example, when this function is used to reverse a list of polymorphic functions, a compiler will reject the usage. However, the function itself does have such functionality. That is, if a compiler did not reject the usage, the function could reverse any lists without runtime errors. Simply because it uses referencing operations, the function is not allowed to get an unannotated polymorphic type. Because of this problem, these two solutions are overly restrictive.

The reverse function may be written with an unannotated polymorphic type as follows:

```
fun reverse 1 =
    if (null 1) then [ ]
    else (reverse (tail 1)) @ [head 1]
``` where @ is a list concatenating operator of the type α list * α list→α list. However, this implementation is less efficient than imperative_reverse with referencing operations. Since efficiency of a program is usually a main issue in industrial programming, this tradeoff is not acceptable to professional programmers who prefer unrestricted referencing operations.

The following proposals attempt to eliminate the above excessive restriction for referencing operations. For example, call by name technique, proposed by Leroy [X. Leroy; "Polymorphism By Name for References and Continuations," In S. L. Graham, editor, Conference Record of the Twentieth Annual ACM SIGPLAN-SIGACT Symposium on Principles of Programming Languages, pp. 220–231, ACM, 1993], is to change semantics of the language for solving all the problems stated above. In addition to call by value semantics in ordinary ML, this solution proposes call by name semantics for some let's. This modification of the language specification is intended to ensure both runtime type safety and an unannotated polymorphic type for imperative-reverse with a few modification of the program. Applying call by name semantics, the following example is considered:

*let fun id(x)=x*

```
fun addone(x) = x+1
val fp = ref (id)
in !fp("abc"); (* "abc" -> "abc" *)
   fp : = addone;
   (* changing the function referred by fp *)
   !fp("xyz") (* "xyz" -> "xyz" *)
end
```

The above repeated example is accepted without runtime type errors according to the call by name semantics. This proposal requires that the value of fp is reevaluated at each usage. In executing this program under the call by name semantics, first, in the body of let-expression, ifp("abc") is evaluated. At this point, the value of fp is evaluated, creating a reference cell which refers to the identity function id. Then by !, the content of the cell, which is id, is taken out. Then the actual argument "abc" is applied to it. At this point, a computer will return "abc." Second, fp :=addone is evaluated. At this point, the value of fp is again evaluated, creating a new reference cell which refers to the identity function id. Then by :=, the content of the cell is modified to refer to the function addone. Finally, !fp(llxyzll) is evaluated. At this point, the value of fp is again evaluated, creating a new reference cell which refers to the identity function id, not to the function addone. Then by !, the content of the cell, which is id, is taken out. Then actual argument "xyz" is applied to it. As the final result, a computer will return "xyz". Speaking in terms of the tunnel metaphor, this proposal requires that a value that has a polymorphic type bypasses the monomorphic tunnels. In other words, the value at entrance point is always referred if it is later used.

The above call by name semantics solution seems perfect in theoretical sense but leaves some practical problems. In this solution, there exist both call by value semantics and call by name semantics in one programming language. Because of these dual semantics, the choice must be made by programmers. This programmer determined semantics introduces other bugs, and program readability decreases due to these two kinds of semantics in one language. Further analysis of the above example reveals that the worst tradeoff is that an assignment statement does not work any more as a previously defined assignment statement. Thus, in addition to an extra burden on the programmer, the modified assignment statement is not a plausible solution to many programmers.

Value only polymorphism technique is proposed by Wright [A. K. Wright, "Polymorphism for Imperative Languages Without Imperative Types, " Technical Report COMP TR93-200, Department of Computer, Rice University, 1993], and is reported to work well on a lot of practical programs. The central idea of this solution is to give monomorphic types to possibly dangerous expressions. It can be syntactically determined whether the expressions are dangerous or not. Intuitively speaking, for example, if a let binding expression is a function application, it is not allowed to get a polymorphic type. Since this solution does not require imperative or weak type variables, it can give an unannotated polymorphic type to the imperative_reverse. However, speaking in terms of the tunnel metaphor, if an expression has the possibility to enter the monomorphic tunnel, it cannot get a polymorphic type, but gets a monomorphic type.

A tradeoff of this solution is that there exists an expression that cannot get a polymorphic type by this solution but gets a polymorphic type by other solutions. This drawback is pointed out by Wright with the following example [A. K. Wright, "Polymorphism for imperative Languages Without Imperative Types," Technical Report COMP TR93-200, Department of Computer, Rice University, 1993]:

```
fun makeCountFun f =
    let val x = ref 0
        fun f' z = (x := !x+1; f z)
        fun rd( ) = !x
        val fp = ref (id)
    in (f', rd)
    end
```

The function makeCountFun takes a function f as argument, and returns both a counting version of f and a function rd that can check the counter. Using this function, consider:

val (map', rdmap)=makeeCountfun map

Although map' should get a polymorphic type, and indeed it gets a polymorphic type by other solutions, this solution cannot give a polymorphic type to map due to syntactic characterization of the binding expression (makeCountFun map). Because of this problem, this solution is still overly restrictive.

There exist still other solutions (for example [J. P. Talpin and P. Jouvelot, "The Type and Effect of Discipline," In Proceedings of the Seventh Annual IEEE Symposium on Logic in Computer Science, pp. 162–173, IEEE Computer Society, 1992; X. Leroy and P., Weis, "Polymorphic Type Inference and Assignment," In Conference Record of the Eighteenth Annual ACM SIGPLAN-SIGACT Symposium on Principles is of Programming Languages, pp. 291–302, ACM, 1991]). However to the author's knowledge, there seems to be no single solution that can give an unannotated polymorphic type to imperative_reverse without any tradeoff mentioned above. Moreover, within call by value semantics, there seems to be no solution that can give a polymorphic type to an expression ref (fn x→x).

In summary, these solutions may not be directed to a true solution for the polymorphic reference problem since they are prevention techniques for avoiding the polymorphic problem. In addition, each attempt has some significant tradeoff.

External references herein incorporated by reference also include Yoshikazu Sato, "A Theory of Type Polymorphism in Imperative Programming," Master thesis, University of Pennsylvania, Philadelphia, Pa., 1994.

SUMMARY OF THE INVENTION

The object of the current invention is to provide a type checker that detects run-time type errors prior to running a program written in a language with imperative constructs as well as polymorphic procedures. In particular, a preferred embodiment of the type checker according to the current invention detects run-time type errors in relation to "ref" and "let" of the ML programming language. According to one aspect of the current invention, a system for detecting a run-time type error in a program prior to running the program whose source code being written in a programming language with imperative constructs and polymorphic procedures, includes an intermediate form translator for translating the source code into intermediate form representations; type representations having predetermined types including a locking type constructor and an unlocking type constructor; and a type checker in response to the intermediate form representations and the type representations for determining whether the program will be free of the run-time type error.

According to another aspect of the current invention, the system for type checking the type checker further includes a first type checker in response to the intermediate form representations and the type representations for determining a first type for each of the sub-expressions so as to determine a second type for the expression based upon a plurality of the first types; and a second type checker in response to the intermediate form representations and the type representations for further determining if the expression will be free of the run-time type error.

According to a third aspect of the current invention, a method of detecting a run-time type error in a program prior to running the program whose source code being written in a programming language with imperative constructs and polymorphic procedures, includes the steps of:

a. providing type representations having predetermined types including a locking type constructor and an unlocking type constructor;

b. translating the source code into intermediate form representations; and c. determining in response to the intermediate form representations and the type representations whether the program will be free of the run-time type error.

According to a fourth aspect of the current invention, a method of type checking wherein the step c further includes the steps of:

d. determining a first type for each of the sub-expressions in response to the intermediate form representations and the type representations and then a second type for the expression based upon a plurality of the first types; and e. further determining in response to the intermediate form representations and the type representations whether if the expression will be free of the run-time type error.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 5 illustrates intermediate representation formats for types according to the current invention.

FIGS. 16A–16C show a flow chart for a first pass type checker W1.

FIGS. 17A–17C show a flow chart for a second pass type checker W2.

FIG. 18 shows the locking and unlocking unification procedure according to the current invention.

DETAILED DESCRIPTION OF THE PREFERRED EMBODIMENT(S)

Figure 2:
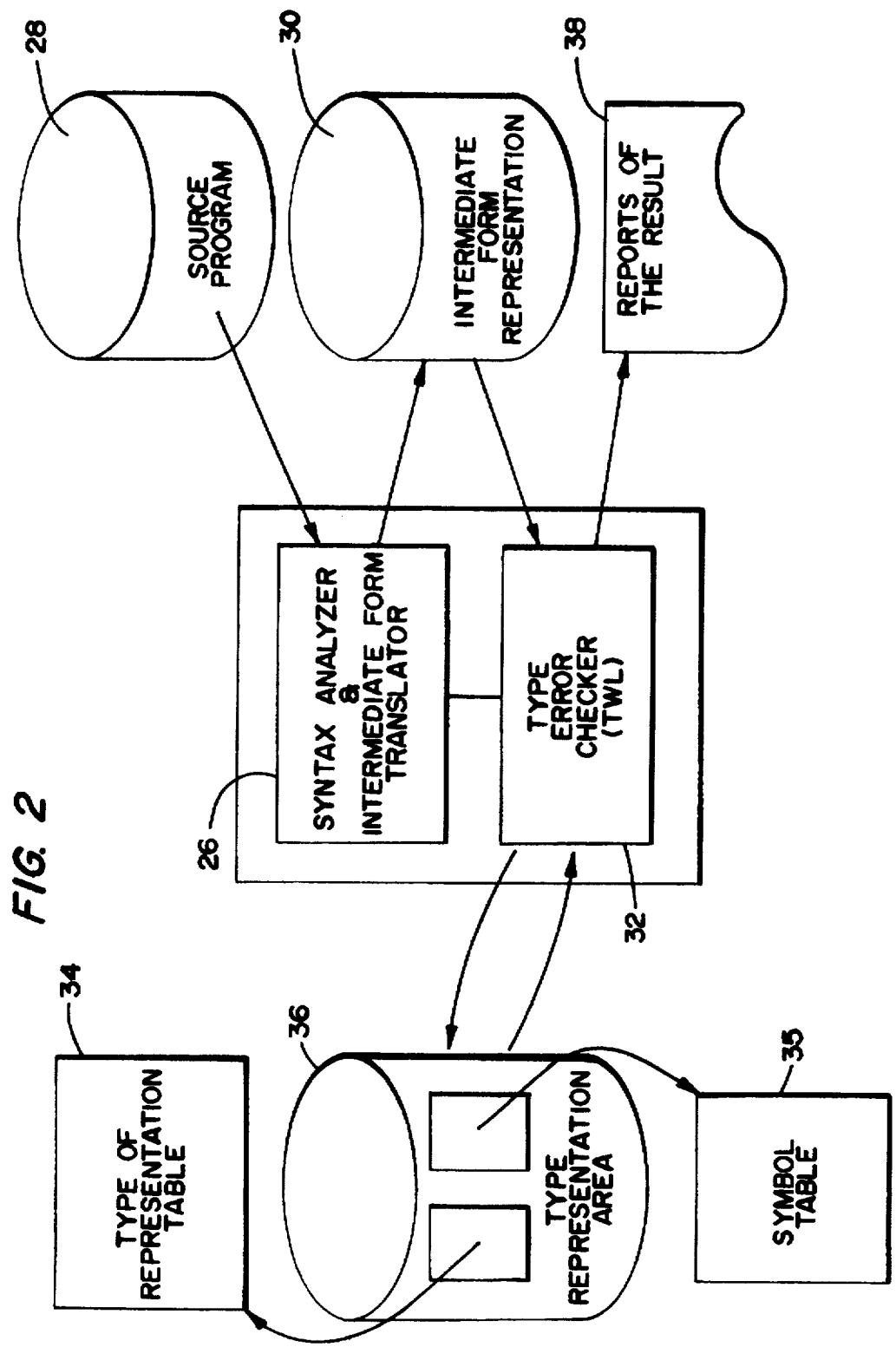
FIG. 2 is a diagram illustrating a system for type checking runtime errors in a program prior to running the program according to the current invention.

Referring now to the drawings, wherein like reference numerals designate corresponding structure throughout the views, and referring in particular to FIG. 2, one preferred embodiment of a runtime type error checker system according to the current invention includes a conventional syntax analyzer and intermediate form translator 26, a source program 28, an intermediate form representation 30, a type error checker 32, a type representation table 34, program type representation 36, and type error report 38.

Figure 1:
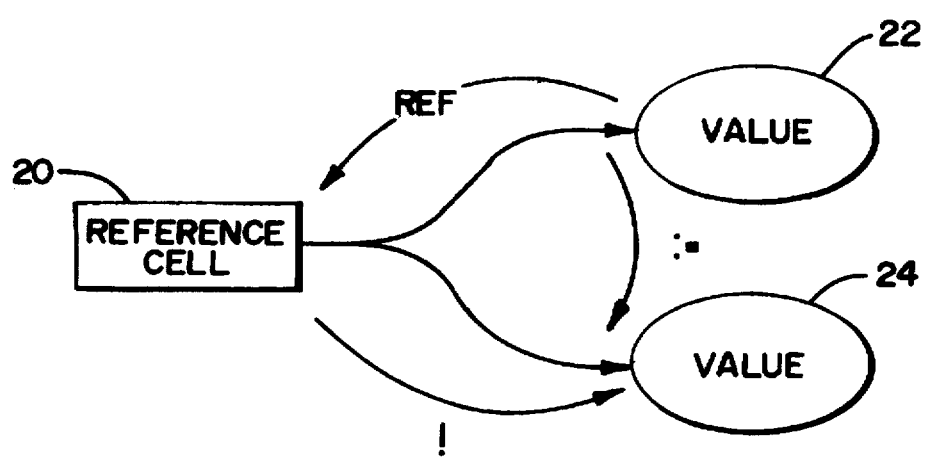
FIG. 1 is a diagram illustrating referencing, dereferencing and assignment operations of ML.

A source program 28, in general, is written in a computer programming language with imperative features such as referencing and jumping. The basic concept of referencing was described above with respect to the ML programming language in FIG. 1. Additionally, the computer programming language may have polymorphic features. However, the run-time type error checker according to the current invention is adaptable for any type of programming languages with imperative and polymorphic features. In fact, a computer language such as LISP, which does not have any strict typing, can be used as a source code language for the run-time type error checker of the current invention.

The source code program 28 is fed into a conventional syntax analyzer and intermediate form translator 26 for compiling an intermediate form representation 30. The intermediate form representation 30 represents the source code program 28 by using a combination of five basic elements as will be later described with respect to FIG. 2. These and other definitions for the purposes of type error checking of the current application include only a sub-set of the ML language definition.

Based upon the intermediate form representations, the run-time type error checker 32 detects the presence of type errors prior to running the program. The runtime type error checker receives a type representation table 34 as an input in addition to the intermediate form representation 30. The type representation table has certain predetermined type representations for certain elements. For example, a constant "+" in ML is predefined to be int→(int→int) type in this table.

During the type checking operation, the runtime type error checker assigns a temporary type to an expression before assigning a final type to the expression. Such a temporary type is written into a program type representation area 36 and may be replaced until a final type is assigned. When the final type is determined for a given expression, the type checker outputs a report 38.

The run-time type error checker 32 guarantees no run-time error when no type error is found based upon this analysis. However, the opposite is not true. In other words, even if the run-time type error checker 32 detects a run-time type error in a source program 28, this detection does not necessarily mean that the compiled source program 28 will have a run-time type error when the program is executed. Thus, the report 38 reports only negative finding of a runtime type error in a source program 28.

Figure 3:
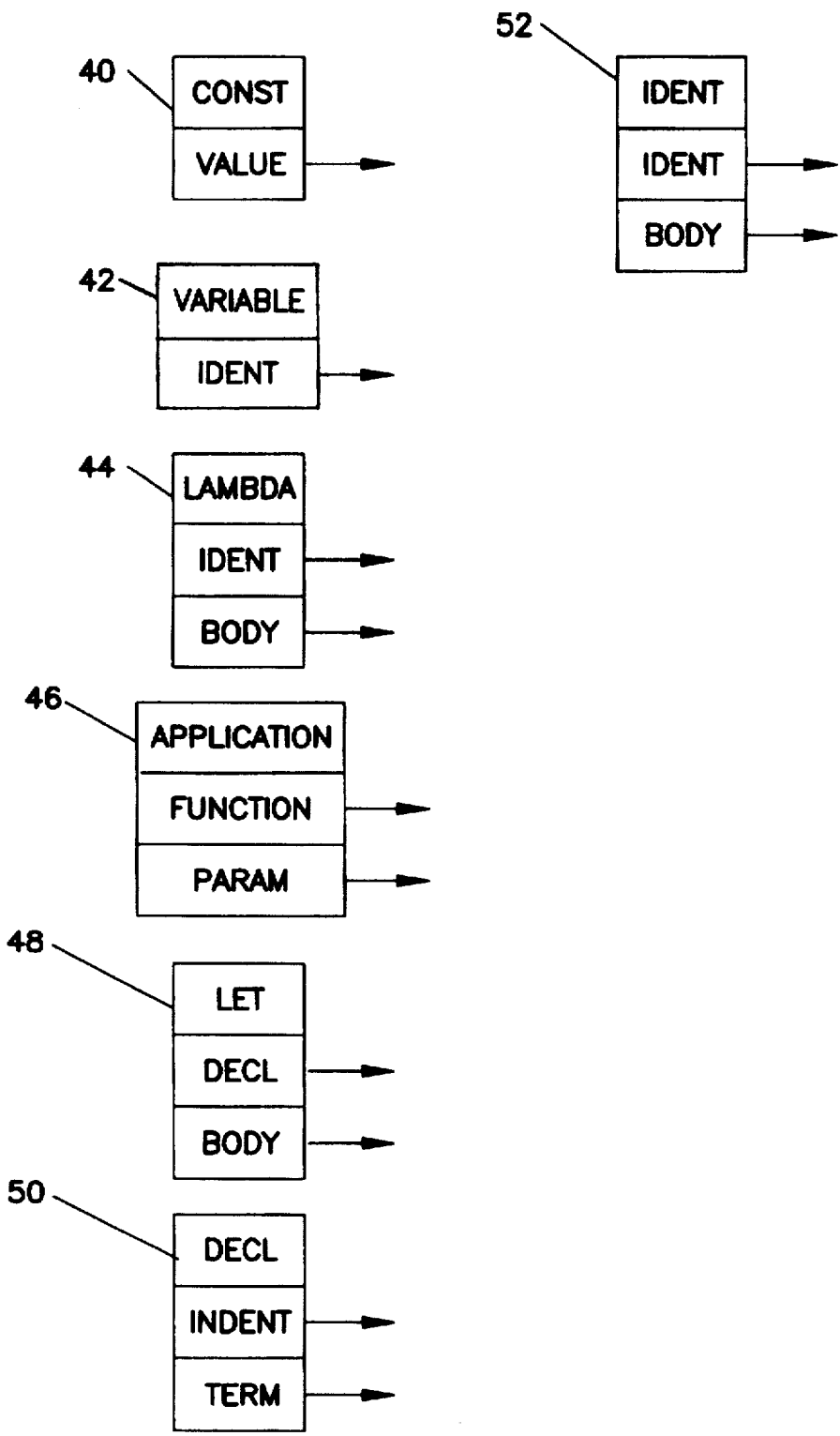
FIG. 3 illustrates intermediate representation formats for expressions for a type checker of the current invention.

FIG. 3 enumerates elements of intermediate form representation of a source code program 28. In general, these elements include constants 40, variables 42, Lambda-expressions 44, function applications 46, let-expressions 48, declarations 50 and identifiers 52. The set of raw terms or expressions of the computer language (ranged over by M) is given as follows:

$$M ::= c \mid x \mid lambda\ x.M \mid M_1 M_2 \mid let\ x = M_1\ in\ M_2\ end$$

where parentheses may be used to avoid ambiguity. In the syntax, it is assumed $c \in$ Constant and $x \in$ Term Variable. Constant 40 is a set of constants that include both data, such as 1,2,3,...., true; false, or "abc", and operations, such as +, −, >, or =.

Variable 42 is represented as variable and includes a pointer to an identifier 52 which includes a variable name. Lambda-expression 44 is represented by a combination of a pointer which points to an identifier 52 and a body which points some expression as a function body. The function body is a combination of the above elements 40–48. Function application 46 is represented by a function and a parameter. A function pointer points to some expression as a function composing of elements 40–48 and a parameter pointer also points other expression as an actual argument composing of elements 40–48.

Let expression 48 is represented by a declaration and a function body. The declaration pointer points to a declaration 50 used as a local declaration while the let body pointer points an expression used as a let body composing of elements 40–48.

Declaration 50 is composed of an identifier and a term. An identifier pointer points to an identifier 52 used as a local variable name while a term points to some expression composing of elements 40–48 used as the value of the local variable.

Lastly, identifier 52 is composed of a name and a type. A name pointer points to a string used as a name while the a type pointer points to a type.

Figure 4:
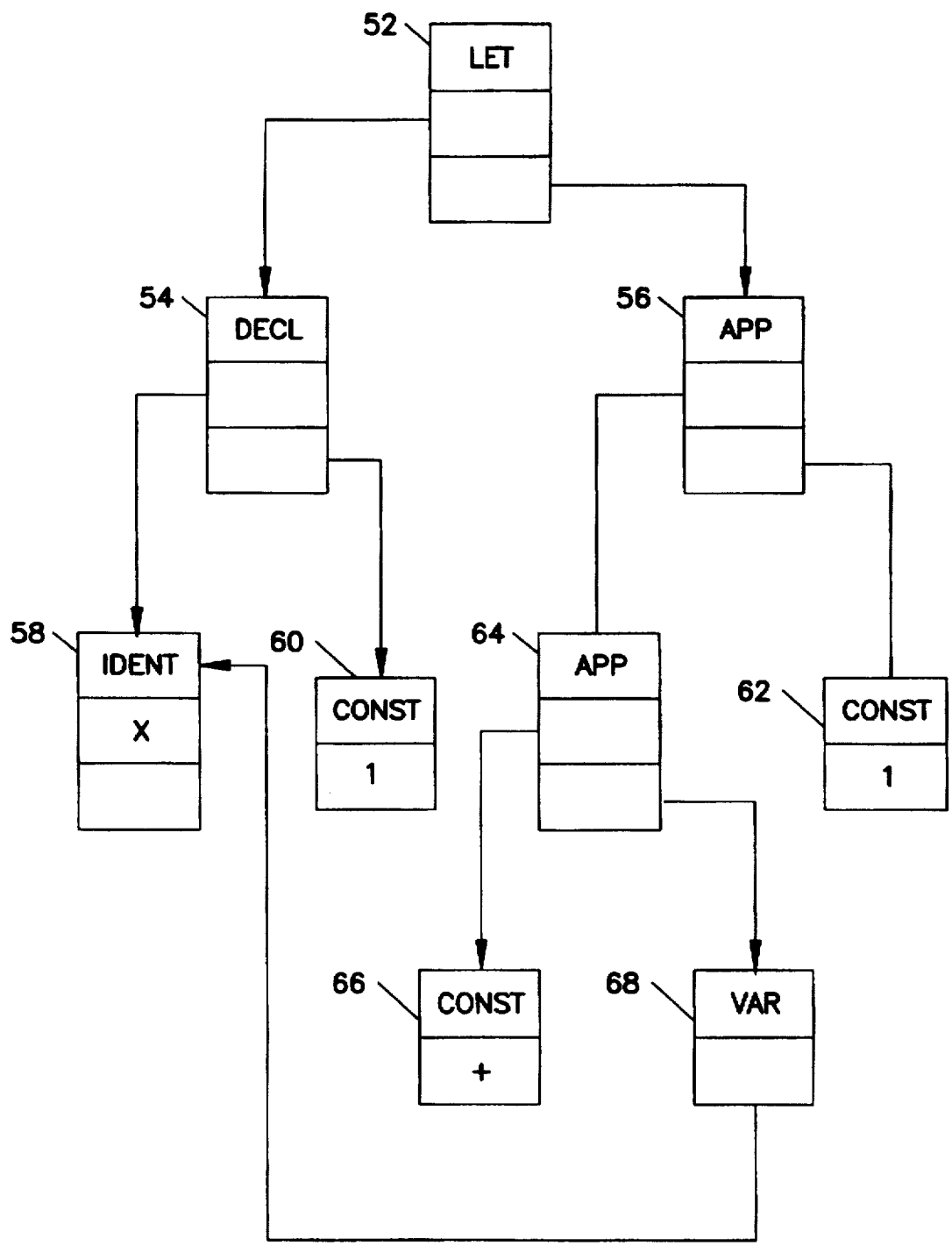
FIG. 4 is another example of an intermediate representation format for "let x=1 in x+1 end."

FIG. 4 is one example illustrating how "let x=1 in x+1 end" is represented in the intermediate format. "let x=1" is represented by a let expression 52 which has a declaration 54 and an application 56. The declaration 54 in turn has an identity 58 containing "x" and a constant 60 containing "1." A part of the let expression "in x+1" on the other hand, is slightly counter intuitive since "x+1" is in fact represented by "((+x) 1)" in a function application format. The application 56 contains a constant 62 having "1" as an argument and an application 64. The argument 62 is applied to the function 64 consisting of another constant 66 containing "+" and a variable 68. The identity of the variable 68 is referred to the identity 58 defined in the declaration of "x" in the let representation 52.

Similarly, FIG. 5 illustrates how a type of an expression is represented in the intermediate expression. Type representation includes a base type 70, a type variable 72, a function type 74, a reference type 76, a locking type constructor 78 and an unlocking constructor 80. In general, the above enumerated types are described as follows: Base types 70 include predetermined ground types such as int, bool and string. The type variable 72 is an element of an infinite set of some fixed but unknown types. The function type 74 is a type that has a parameter type for a function and its returned type from the function. The function type 74 is denoted by a horizontal right arrow along with a parameter type on the left side of the arrow and a function return type on the right side of the arrow. The reference type 76 is a reference or pointer type.

In addition to the above-described types, the following type constructors have been defined for the type checker according to the current invention. In general, the locking type constructor 78 is used to denote a given type is a locked type. The locking type constructor 78 is indicated by L. The unlocking type constructor 80 denotes that a given type is a unlocked type and indicated by U.

Locked type is defined in a following inductive way:

a. Base type 70 is by definition locked.

b. Type variable 72 is by definition not locked.

c. Function type 74 is locked if both parameter and result types are locked. Otherwise, the function type as a whole is not locked.

d. Reference type is locked if a type that is referenced by a pointer type is locked. Otherwise, the reference type as a whole is not locked.

e. Locked type (i.e., L[type A]) is locked.

f. Unlocked type (i.e., U[type A]) is locked if type A is locked.

Otherwise, it is not locked. As the above definitions show, type A is locked if the type contains no type variables or if the type contains only locked type variables.

Figure 6:
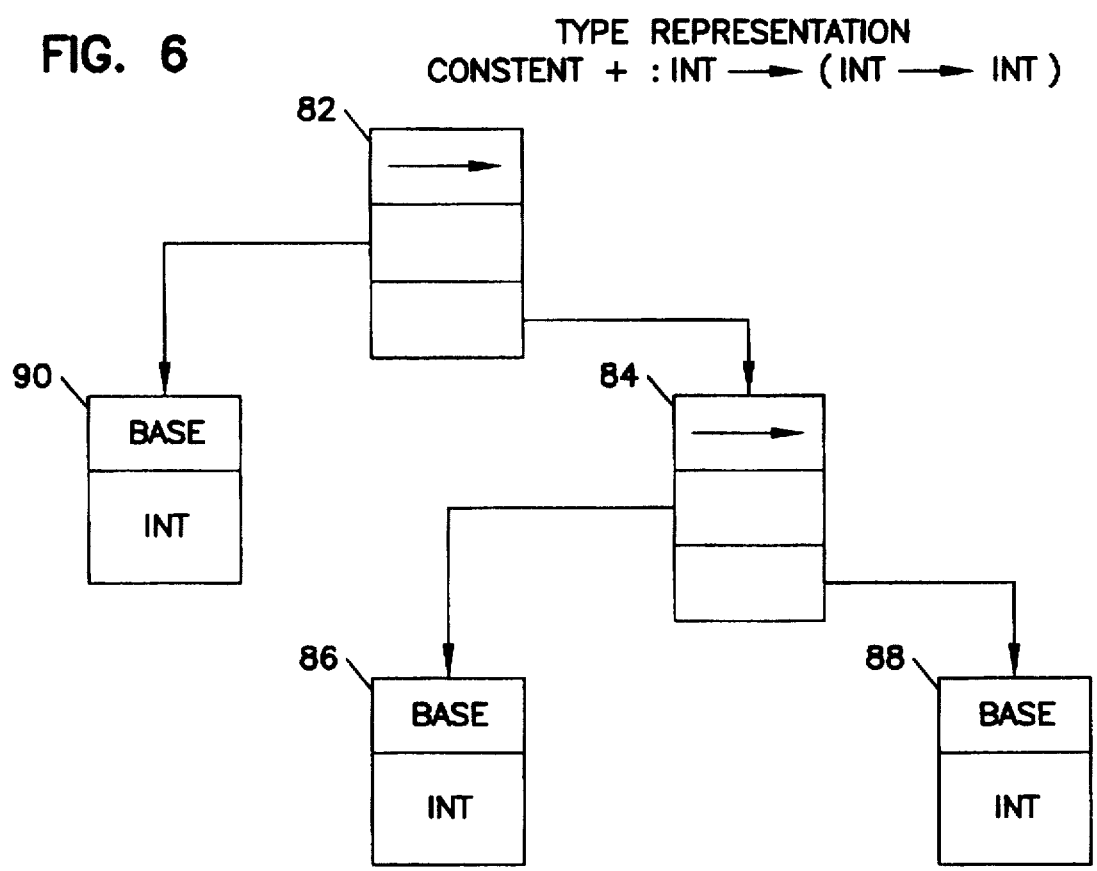
FIG. 6 is an example of type representation for a constant "+" using the type representation as defined in FIG. 6.

FIG. 6 shows an example of type representation for a constant "+," which has a function type denoted by arrows. Although "+" takes two integers and returns another integer as a result, "int→(int→int)" represents essentially the same result by two functions which return an integer. Thus, a function type 82 takes a base integer 90 and returns a function type 84 consisting of two integers of a base type 86, 88.

Figure 7:
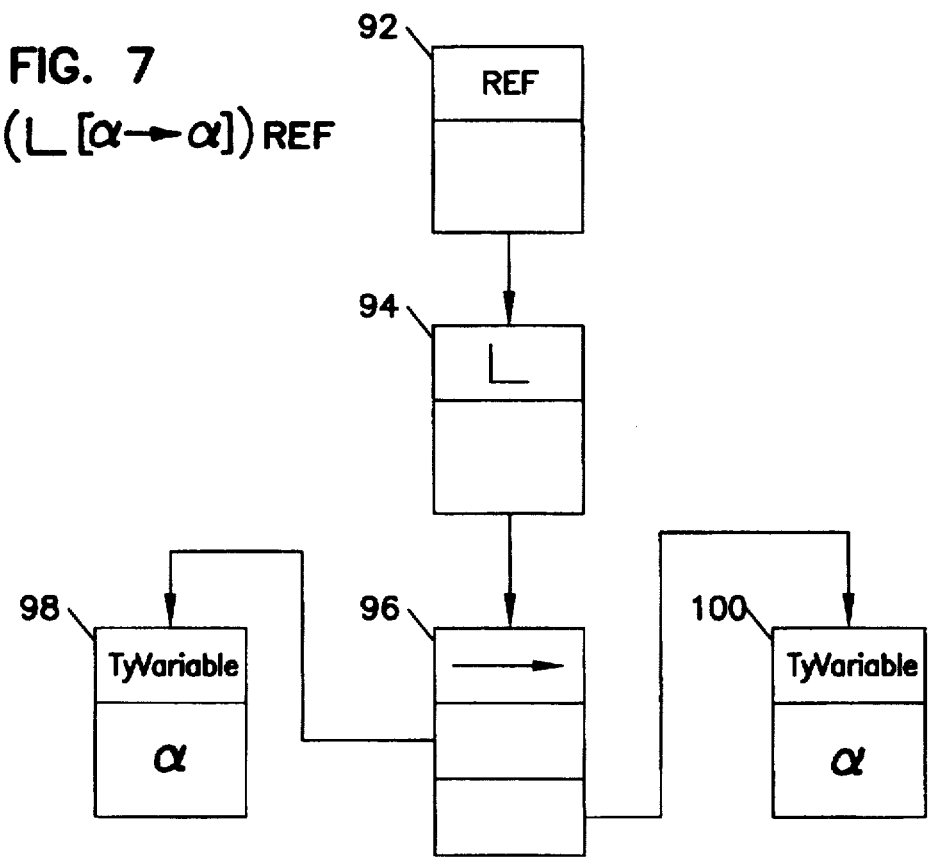
FIG. 7 is another example of type representation for an expression "ref(fn x→x)."

FIG. 7 illustrates another intermediate type representation of a pointer to a polymorphic function, $\alpha \to \alpha$. L[$\alpha \to \alpha$]ref is represented by a pointer type 92 which has a locking constructor 94, which locks a function type consisting of a type variable 98 as a parameter and another type variable 100 as a return type. The locked type is an alternative constraint for polymorphic use of a polymorphic type constructs to more explicit constraints as described above in the prior attempts. When a pointer type is created, the pointer is constrained with a locking type constructor at its creation for later use.

Intuitively, in the locked type, free type variables cannot be freely replaced by some specific types in a polymorphic way. If the locked type variable is to be replaced to a more specific type, the locking constraint must be cancelled by an unlocking type constructor. After this cancellation, in an unlocked type, free type variables may be replaced to a more specific type in a polymorphic way. The above-described constraint is used to prohibit an assignment expression to polymorphically change the type of a stored value in memory. For example, L[$\alpha \to \alpha$]ref is prohibited from using in a polymorphic way until it is unlocked. If a program contains any assignment of a type variable in the locked type such as L[$\alpha \to \alpha$]ref, a type error is detected To use a locked type variable in a polymorphic way, in general, the above-described lock in a type variable must first be removed. Such a removal is accomplished by dereferencing of a pointer type. That is, if a value stored in a memory cell referenced by a variable of the locked type is extracted from the memory cell, its type can be again treated in a polymorphic way.

Figure 8:
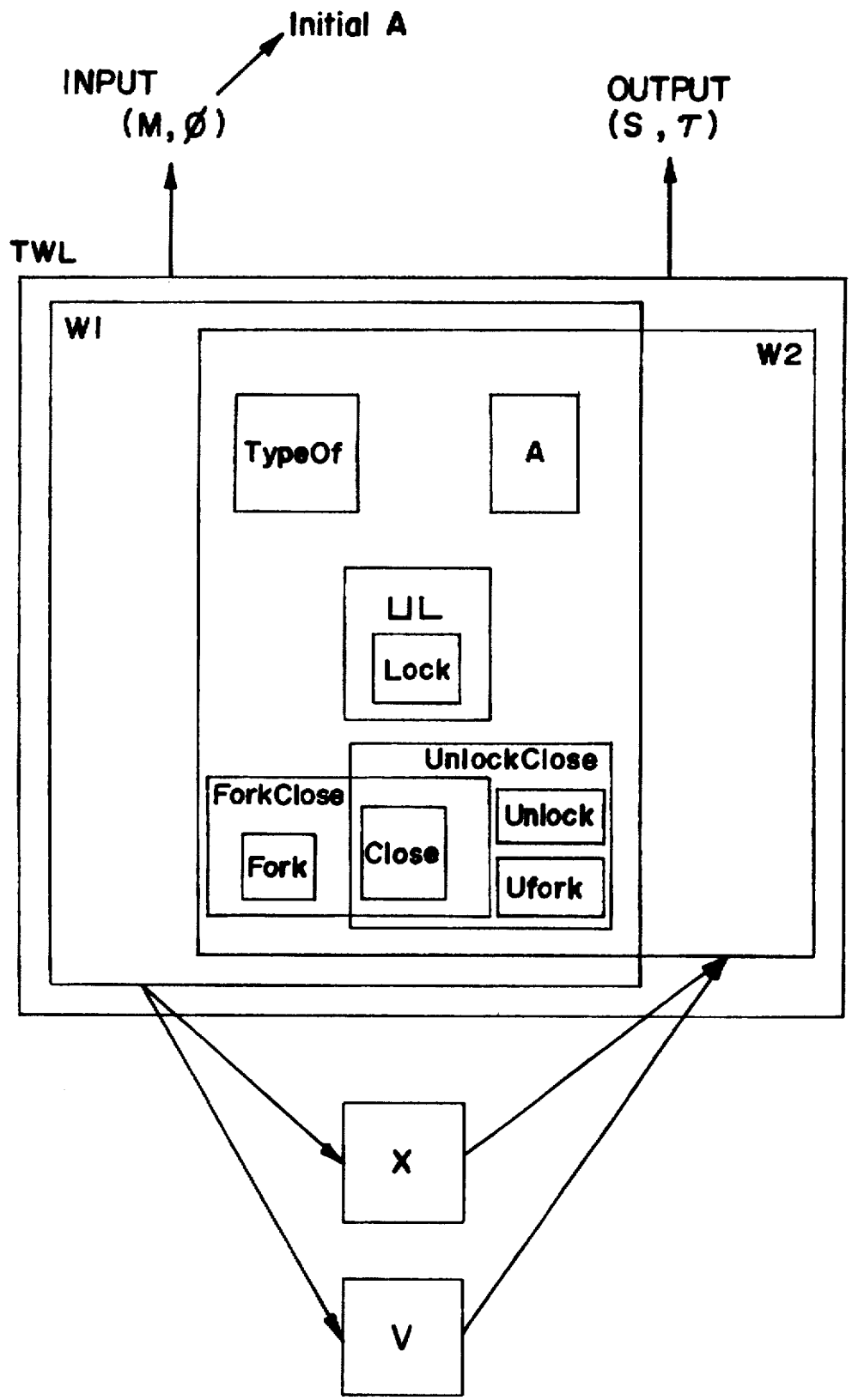
FIG. 8 is an overview flow chart illustrating a two-stage processing according to the type checker of the current invention.

Based upon the above-described constraints, the type checker TWL according to the current invention in general determines whether a program is free of a run-time type error as shown in FIG. 8. To make the determination, the type checker attempts to determine a type for every sub-expression in the program M according to the predetermined types and typing rules such as the above-described locked type. Based upon the type of each sub-expression, a type of the expression is determined. The type checker TWL has two components W1 and W2, and they determine a type in a similar way. Although these components W1 and W2 each further includes the same sub-components as will be described later, an output from W1 is used as a part of input to W2 so that a type determination is more accurately made under certain conditions. W1 and W2 includes the following subcomponents: TypeOf, TypeAssignment, UL, ForkClose and UnlockClose. UL in turn includes Lock. ForkClose further includes Fork and Close while UnlockClose further includes Unlock, UFork and Close. Each of these components and sub-components may be implemented in a electrical circuit or computer software and will be described in the following.

Figures 9A, 9B:
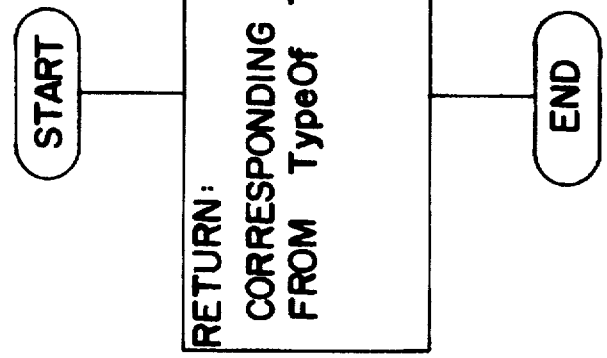
FIGS. 9A–9B respectively represent a flow chart for TypeOf and a TypeOf table.
Figures 10A, 10B:
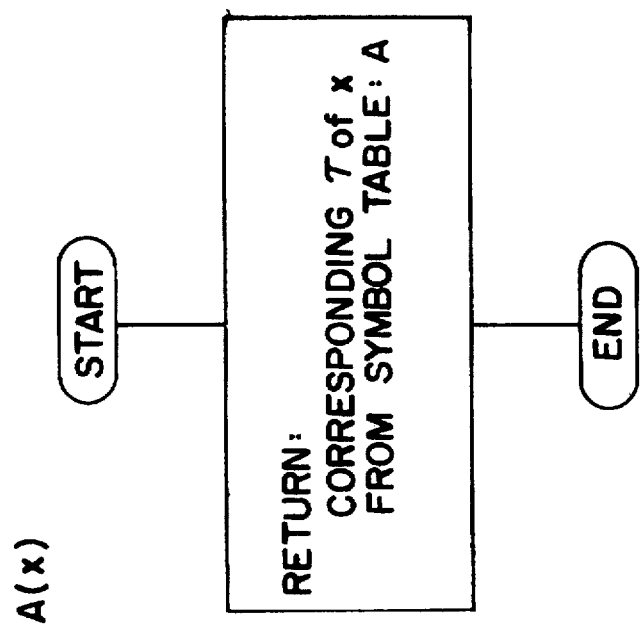
FIGS. 10A–10B respectively represent a flow chart for TypeAssignment and a TypeAssignment or Symbol table.

Now referring to FIG. 9, TypeOf takes a constant and returns a corresponding predetermined type for the constant from a TypeOf table. For example, if TypeOf receives a constant 11+11 as an argument, it finds a corresponding entry in the TypeOf table and returns a predetermined type "int->(int->int)" as described in relation to FIG. 6. Similarly, FIG. 10 illustrates that a function TypeAssignment returns a corresponding predetermined type for a given variable from a symbol table or a type assignment table. Type assignment is a finite map from variables to type schemes or sets of types.

Figure 11:
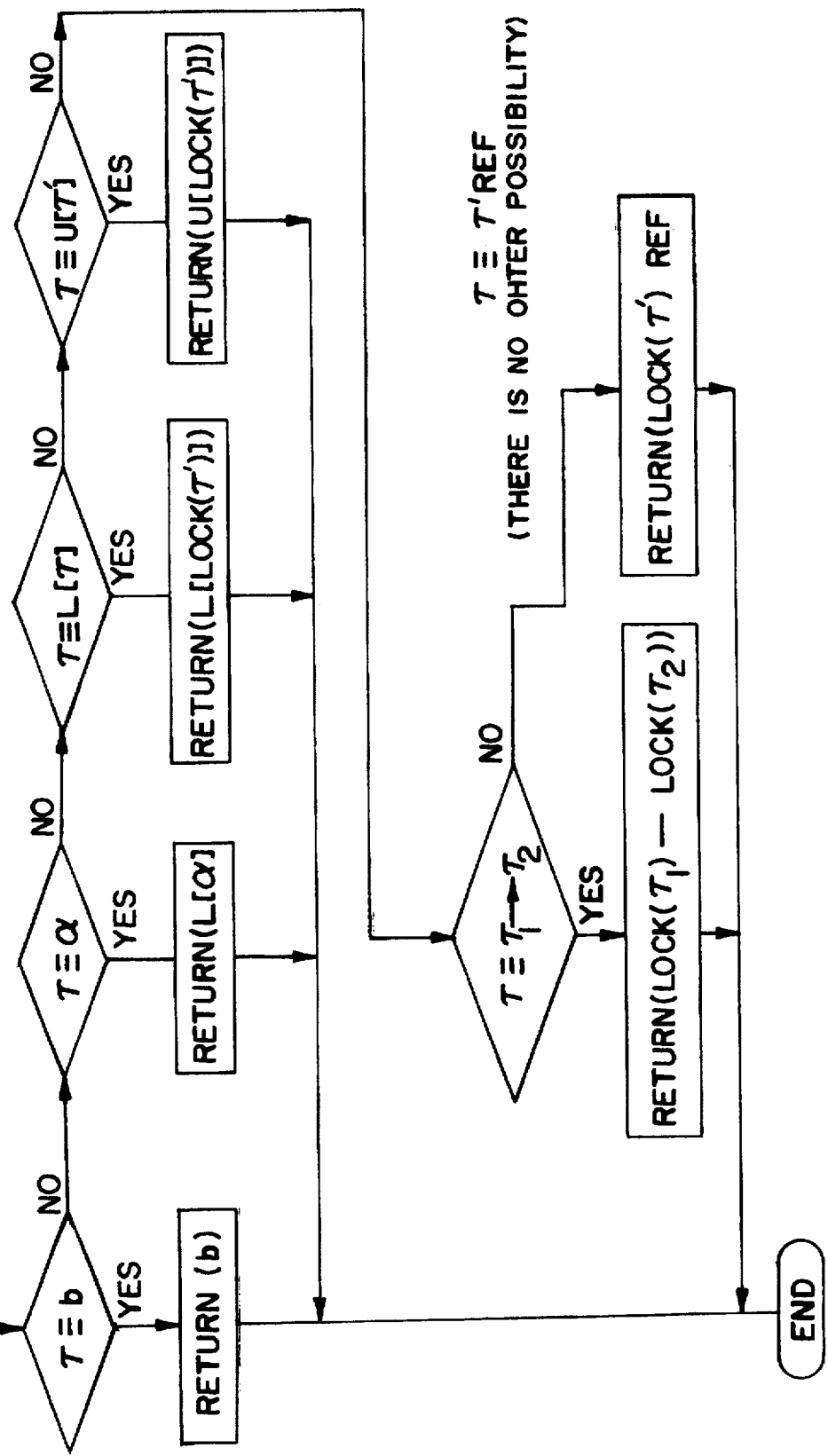
FIG. 11 shows a flow chart for Lock.

Referring to FIG. 11, Lock in general accepts a type and returns a locked type. However, Lock determines a locked type by the following sequential tests. If a type is a base type, since there is no need to lock the base type, Lock simply returns the base type. If Lock receives a type variable a, which is not yet locked, it returns its locked type variable "L[$\alpha$]." In certain situations, Lock receives an already locked type L[tau] as an argument, Lock further locks the already locked type tau and returns "L[Lock(tau)]" which recursively locks all type variables in tau. On the other hand, Lock sometimes receives an unlocked type U[tau] as an argument and returns U[Lock(tau)], which recursively locks all type variables in tau. Lastly, Lock determines if an argument is a function or a pointer. If the argument is a function, Lock returns "vLock(tau$_1$)>Lock(tau$_2$)." For a pointer, Lock returns "Lock(tau) ref.[1]" Referring to FIG. 12. Unlock in general accepts a type and returns a unlocked type if appropriate. The significance of the unlocked type includes that the formally imposed restriction for polymorphic use of a type variable is removed. In the prior attempts, no such removal of polymorphically restricted use during the course of a type error analysis had been disclosed. In particular, the polymorphic constraints are removed when a pointer variable is dereferenced or the value is used after jumping to a predetermined location in accordance with the current invention. For example, ML provides "If" for dereferencing.

Figure 12:
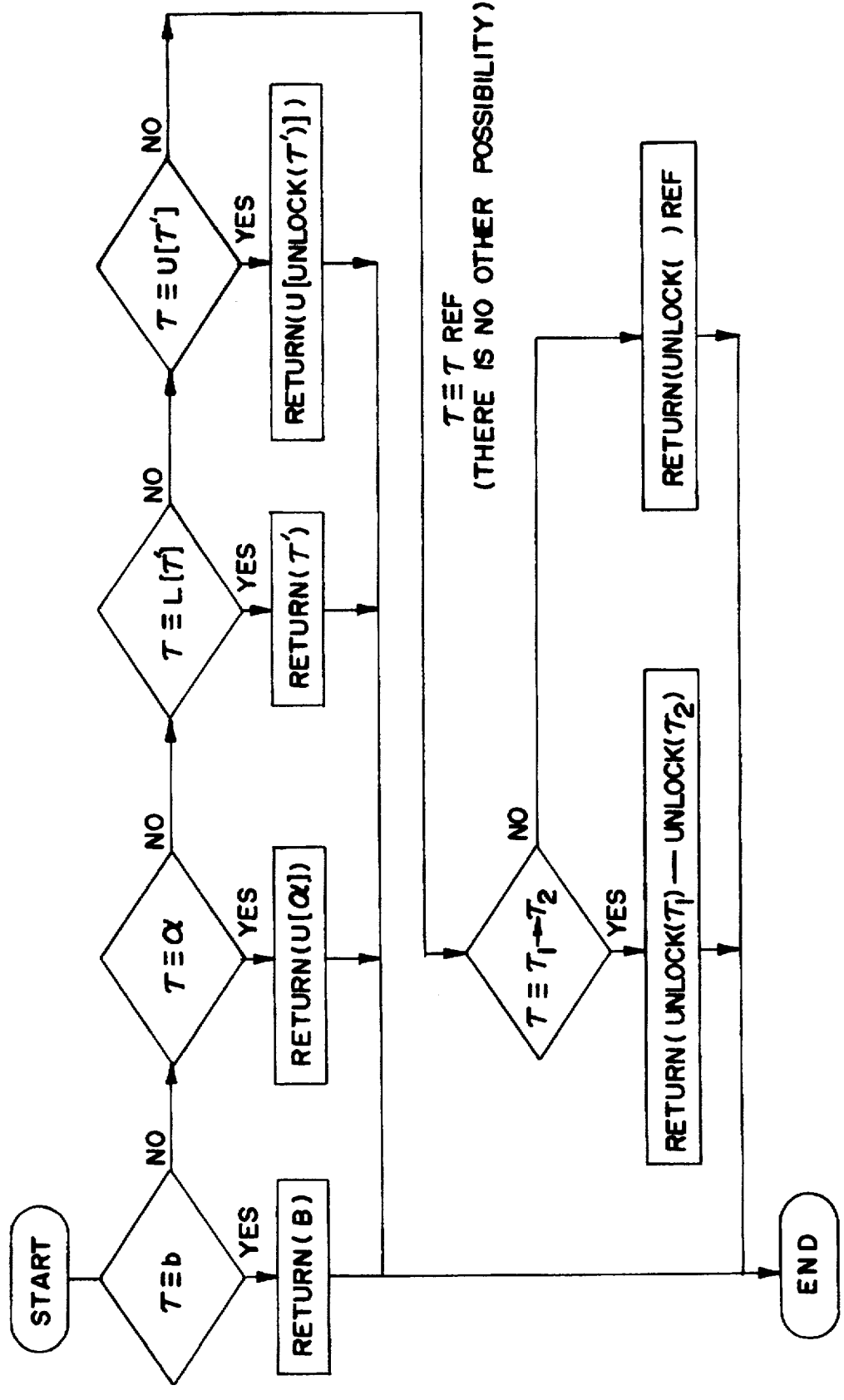
FIG. 12 shows a flow chart for Unlock.

Still referring to FIG. 12. Unlock determines the unlocked type by the following sequential manner. If an argument is a base type. Unlock simply returns a base type. If an argument is a type variable a, Unlock returns "U[α]." In certain situations, Unlock receives a locked type L[tau] as an argument. Unlock unlocks and cancel the already locked type tau and returns "tau." On the other hand, Unlock sometimes receives an already unlocked type U[tau] as an argument and returns U[Unlock(tau)], which recursively unlocks all type variables in tau. Lastly, Lock determines if an argument is a function or a pointer. If the argument is a function, Unlock returns "Unlock($\tau_1$)→Unlock($\tau_2$)." For a pointer, Unlock returns "Unlock(tau) ref."

Figure 13:
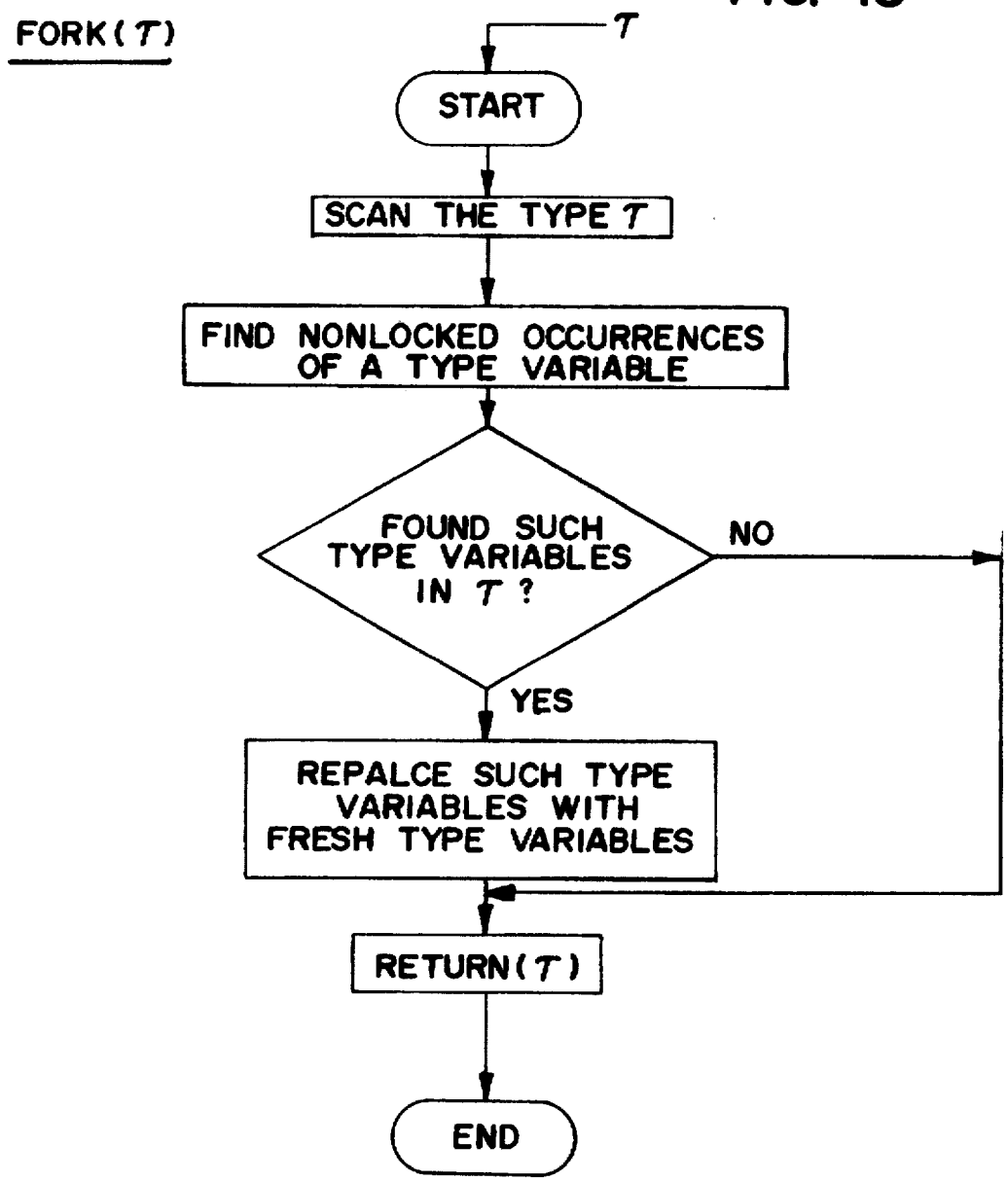
FIG. 13 shows a flow chart for Fork.

Referring to FIG. 13, Fork in general manipulates certain type variables so as not to unnecessarily restrict these type variables under predetermined condition. Fork receives a type T as an argument and scans the type. If non-locked or not-yet locked occurrence of a type variable is found in the type tau, such occurrence is replaced with a fresh type variable. For example, in L[α]→α, the type α is partially locked. The left occurrence is a locked occurrence while the right is nonlocked occurrence. The replacement of the nonlocked occurrence in effect makes the replaced type variable available for further type modification. In other words, the replaced fresh type variable is removed from the constraints of the above-described locked type. Fork then returns the entire type tau that includes the replaced fresh type variable as denoted by L[α]→β.

Still referring to FIG. 13, Fork is more formally defined to receive TypeAssignment * Type and returns Type as follows:

---
$$\text{Fork}(\tau) = \text{let } (\tau_1, S) = \text{Fork}'(\tau, 0)$$
$$\text{in } \tau_1$$
$$\text{end}$$
--- where Fork' is the function defined in a following inductive way:

```
Fork'(b, S)           -> (b, S)
Fork'(α, S)           -> (α, S)
               if  (1) α is fully locked in τ,
                   (2) this is a locked occurrence in τ,
or
                   (3)
                   α is not locked in τ and
                   is partially locked, not locked, or
                   not appear in A.
                   -> (β, S U {(α -> β)})
                   if α ∈ dom (S) and
                   α is fully locked or not appearing
in A, and
                   if (1) this α is a nonlocked
                   occurrence in τ, or
                   (2) is not locked in τ
                   where β is fresh
                   -> (S, Sα) otherwise (α ∈ dom(S))
Fork'(L[τ], S)        -> let (τ', S') = Fork'(τ, S)
                         in (L[τ'],S')
                         end
Fork'(U[τ], S)        -> let (τ', S') = Fork'(τ, S)
                         in (U[τ'], S')
                         end
Fork'((τ_1->τ_2),S)   -> let (τ'_1, S_1) = Fork'(τ_1, S)
                         and (τ'_2, S_2) = Fork'(τ'_2, S_1)
                         in((τ'_1->τ'_2), S_2)
                         end
Fork'(τ ref, S)       -> let (τ', S') = Fork'(τ, S)
                         in ((τ' ref), S')
                         end
```

As shown in the above definition, the forking operation acts only on nonlocked occurrences of type variables, except partially or not yet locked ones in A. All other components of types stay unchanged. For example, if a type variable α is partially locked in τ, then nonlocked occurrences of α are replaced by a fresh type variable, while locked occurrences stay unchanged. As a result of the forking operation, locked and nonlocked occurrences of the type variables behave like distinct type variables.

Figure 14:
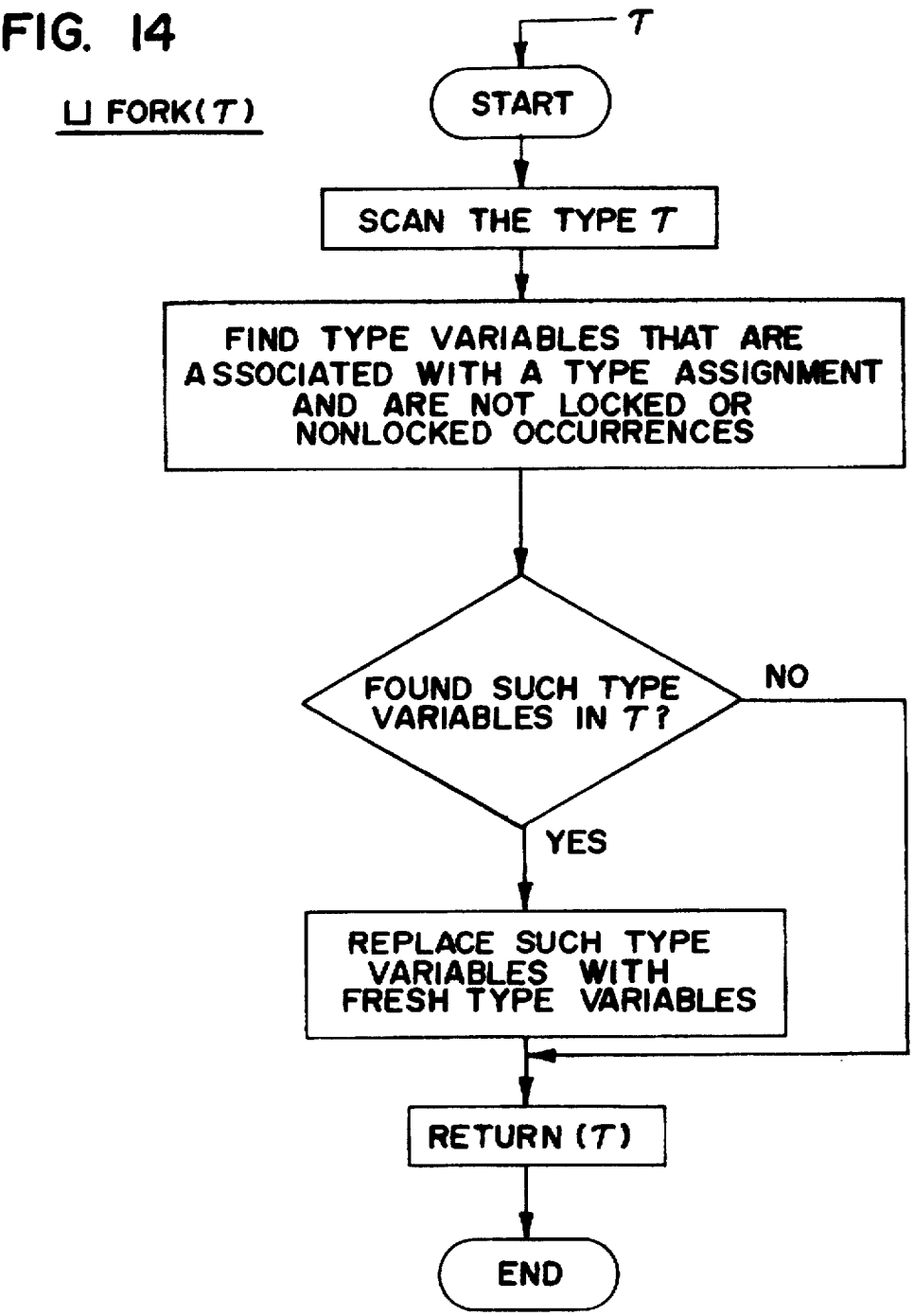
FIG. 14 shows a flow chart for UFork.

Now referring to FIG. 14, by the same token, UFork replaces with a fresh type variable those type variables that are associated with a type assignment and either not yet locked or nonlocked occurrences of type variables. The difference between Fork and UFork is that UFork acts only on associated type variables that are associated with a type assignment. The definition of the associated type variables is given below in the description on Close. As described above, the type assignment is a map between a variable and a type. Although in general, a type variable associated with a type assignment may be a true type variable that cannot be a specific type, an associated type variable has a nonlocked occurrence or is not yet locked. Under these conditions, these associated type variables may be forked to remove some of the restrictions for use.

Close is a part of ForkClose and UnlockClose as shown in FIG. 8. Close lists all the type variables except for any partially locked or not yet locked type variables appearing in the type assignment, any fully locked type variables or any locked occurrences of partially locked type variables. The listed type variables are in general "safe" type variables as opposed to the excluded "dangerous" or "suspicious" type variables. Among these excluded type variables, if any type variable is not yet associated with any type assignment, such type variable is marked as an associated type variable α. Thus, in effect, the associated type variable α satisfies the following three conditions: a) α is not yet associated with any type assignment; b) α is fully locked in Fork$_A$ (τ) and c) a is fully locked or does not appear in the type assignment A. The associated type variables should in fact be most cautiously used or restricted since their use may cause type errors.

Figure 15:
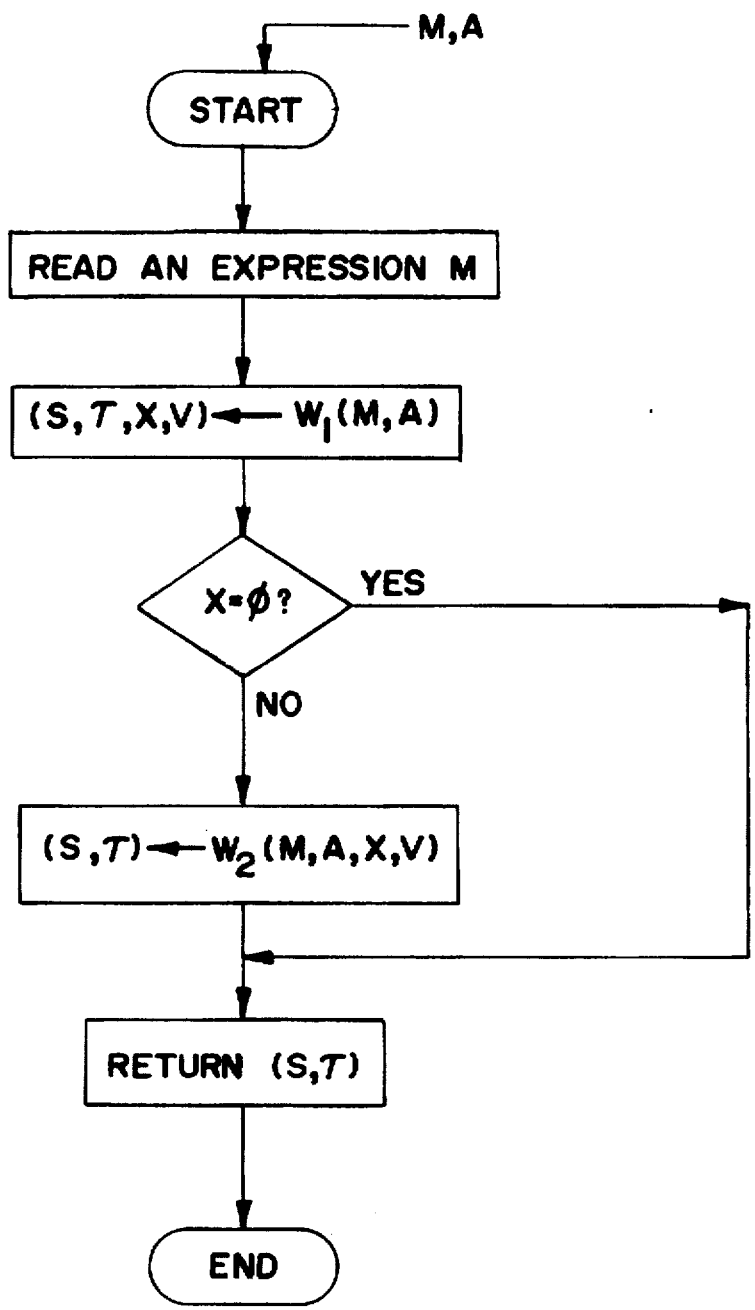
FIG. 15 shows a flow chart for an overall two pass TWL type checker.

The type checker TWL according to the current invention utilizes the above-described components to determine a type of each sub-expression. To determine the type, the type checker TWL has a two-stage process as shown in a flow chart in FIG. 15. A meta variable or an expression M is inputted into the type checker TWL. First, the first type checker Wi determines a type of M based upon a given type assignment and returns a type τ based upon an unification algorithm, X for a locked type variable-type table, V for a local variable-type table and S for a substitution used for substituting to a more specific type. When there is no substitution for a locked type variable, that is X is empty, there is no need to further determine a type by a second type checker W2. On the other hand, when X is not empty, the second type checker W2 further determines the type of M based upon the type assignment A, the locked type variable-type table X, and a local variable-type table V. Regardless of the second type checker, the TWL type checker ultimately returns the type and the used substitution.

Figure 16A:
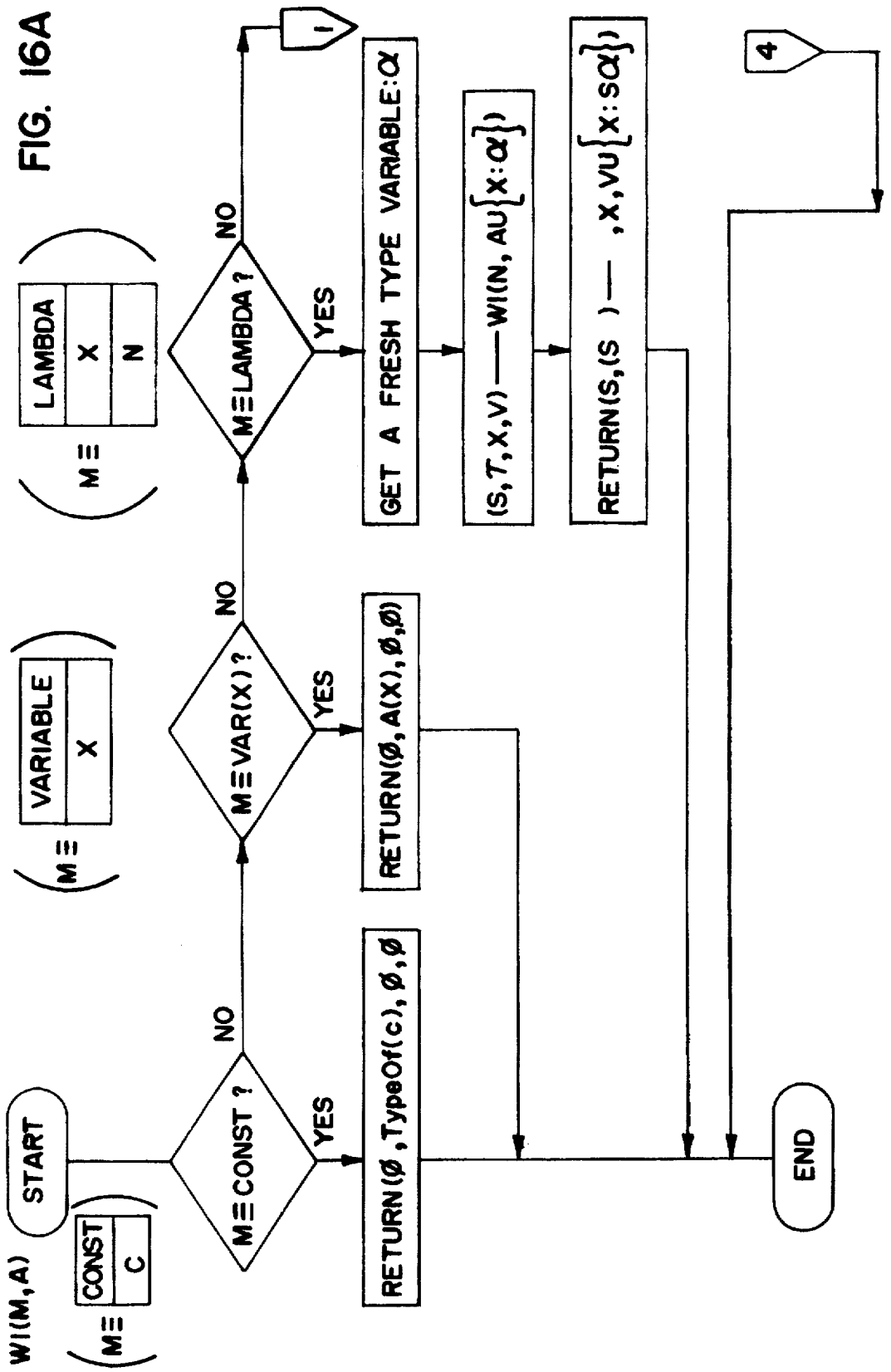
Figure 16C:
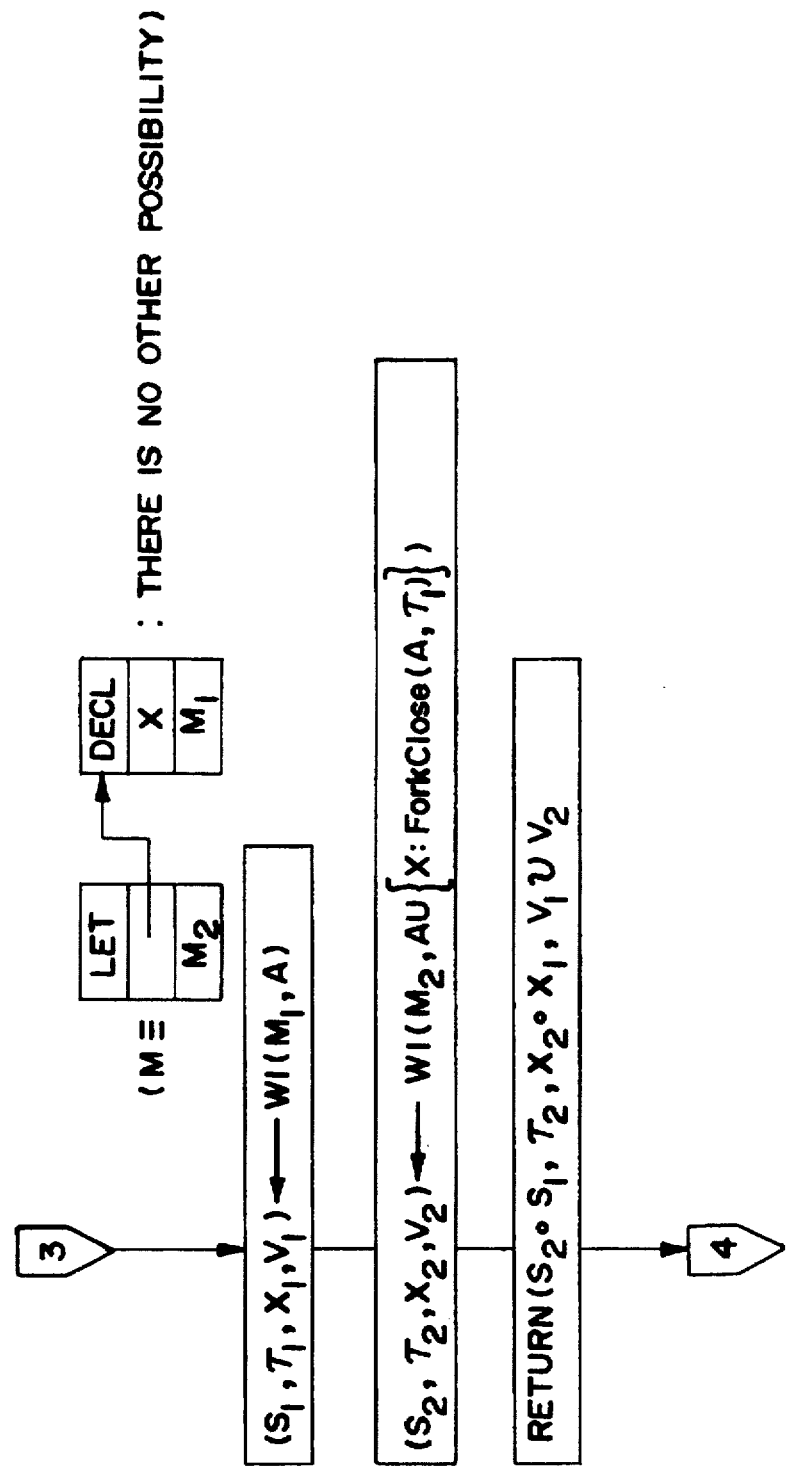

FIGS. 16A–16C show a flow chart for W1. W1 in general determines a type of an expression M based upon the intermediate representation format using unification algorithm. Referring to FIG. 16A, if M is a constant, since its type is predetermined in the TypeOf table, a corresponding type returned by TypeOf is returned from W1. Similarly, if M is a variable, since its type is listed in an type assignment table, a return value from TypeAssignment is a type of the variable.

Still referring to FIG. 16A, unlike the above constant and variable cases, if M is a lambda expression, a new type variable a is added to a type assignment since a variable x is not yet known. Then, the first type checker W1 is recursively called with a body of the function N along with the augmented type assignment until the type is determined. The first type checker returns a substitution S, a type, the locked type variable-type table, the local variable-type table that includes type variable α.

Now referring to FIG. 16B, if M is a function application represented by M1 and M2 in the intermediate representation format, the first type checker W1 is recursively called respectively for M1 and M2 to determine each type $\tau_1$, $\tau_2$. Since M1 must have a function type (i.e. $\tau_1 \rightarrow \tau_2$) and M2 must have $\tau_1$, these conditions are generally ascertained by the unification algorithm. In particular, with a type variable α, the above conditions are met if $\tau_1$ is a compatible type with $(T_2 \rightarrow \alpha)$. The compatibility concept will be described later in relation to unification.

The compatible type with respect to the locking type constructor is defined as one of the following conditions and denoted by —:

a. $\tau$—$\tau$ b. α—$L^n[\alpha]$ if α is partially locked or not locked in A.

c. α—$U^n[\alpha]$ if α is partially locked or not locked in A.

d. if $\tau_{11}$—$\tau_{21}$ and $\tau_{12}$—$\tau_{22}$, then $(\tau_{11} \rightarrow \tau_{12})$—$(\tau_{21} \rightarrow \tau_{22})$ e. if $\tau_1$—$\tau_2$ then $(\tau_1$ ref$)$—$(\tau_2$ ref$)$ f. if $\tau_1$—$\tau_2$ then $L[\tau_1]$—$L[\tau_2]$ g. f. if $\tau_1$—$T_2$ then $U[\tau_1]$—$U[\tau_2]$ Based upon the above definitions, when the unification succeeds in determining a type, a pair of substitutions $S_0$, $X_0$ is returned. Thus, the type of the original expression M is regarded as a result of all the substitutions made to a (i.e. $(S0.S1.S2)(\alpha)$). If the result of the substitution is $U[\tau']$ indicating possible unlocking of a locked type, UnlockClose removes the locking constraints. The first type checker W1 returns a composition of S's, X's and V's along with a type τ.

Lastly, referring to FIG. 16C, when the expression M is a let expression (i.e. let x=M1 in M2 end), the first type checker is recursively used to determine a type of M1. Assuming $T_1$ denotes a type of M1, a type of x is determined by ForkClose based upon $\tau_1$. The returned type from ForkClose is added to the type assignment to determine a type of M2 or $\tau_2$, and the first type checker is recursively called with these parameters. The first type checker finally returns S's, $\tau_2$, X's and V's.

Figure 17A:
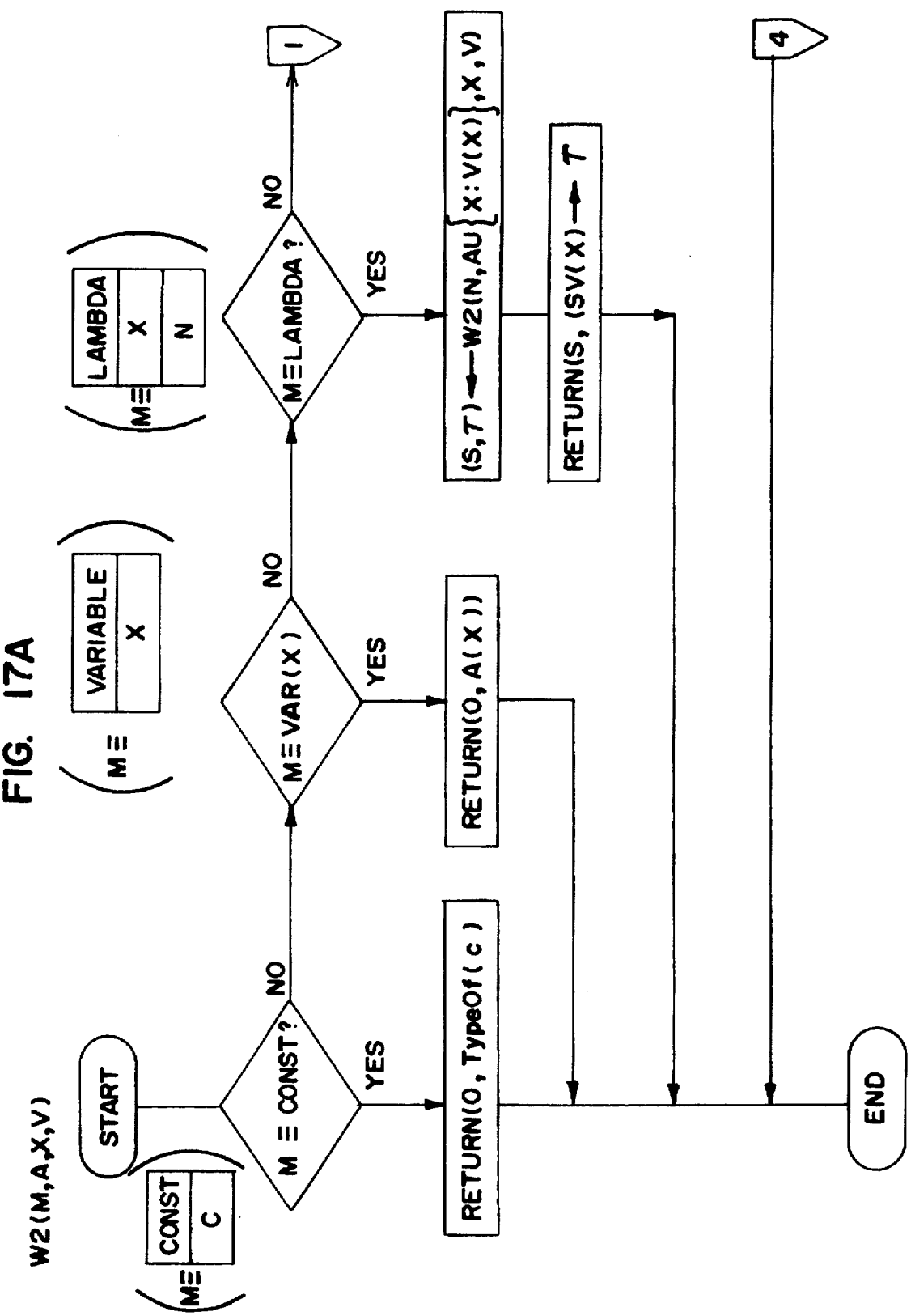
Figure 17C:
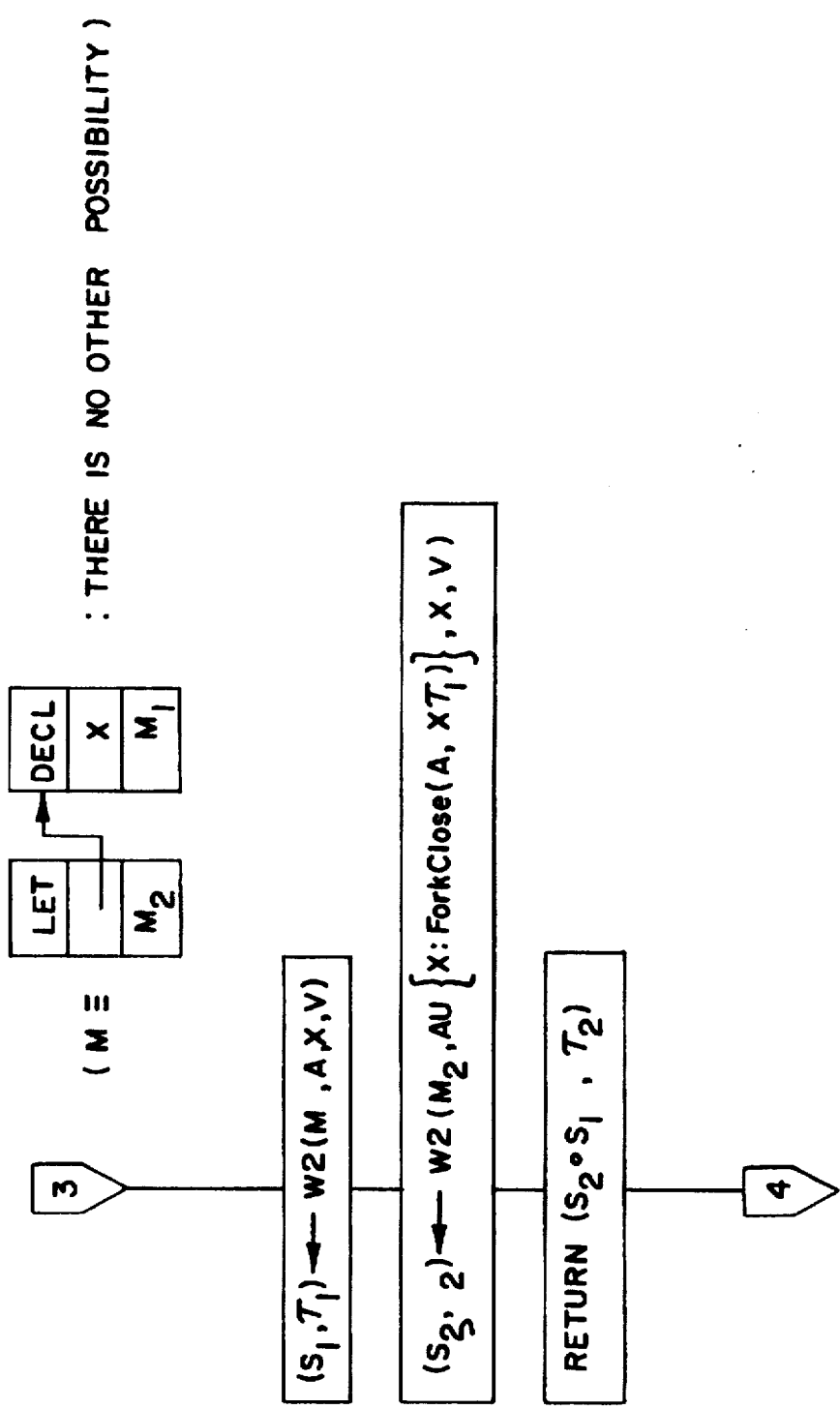

Referring to FIGS. 17A–17C, a second type checker *is substantially the same as the first type checker. However, the second type checker uses the results from the first type checker. In particular, as shown in FIG. 17A, if M is a lambda expression, W2 is provided with a variable "A U {x:V(x)}" along with X and V that include the results from W1. Referring to FIG. 17B, similarly, if M is a function application, W2 is provided with A, $S_2A$, X, V that are returned from W1. Similarly, UL is provided with "$(S_1\tau_2 \rightarrow \alpha)$." Lastly, referring to FIG. 17C, if M is a let expression, W2 is recursively provided with "A U {x:ForkClose (A, X$\tau_1$) }."

As described above, the run-time type error checker of the current invention utilizes various components to evaluate each sub-expression to a type and then attempts to unify these types into a single type. In unifying the types, types are compared to determine if two of them are equivalent or compatible. Although such unification has been established in the past, the current run-time type checker utilizes the above-described new rules which defines compatible types with respect to locking type constructors.

Referring to FIG. 18, during unification, the current type checker must resolve a comparison of a locked type variable L[α] and another nonlocked type variable β. If the type variable 0 is associated with a corresponding symbol table or type assignment, the nonlocked type variable A has priority in unification. Thus, a is unified to β. As described above, since the compatibility rule used by the current type checker defines that L[β] is compatible with β, the type checker successfully returns a type. If on the other hand, if L[α] is associated with the type assignment, L[a] has priority and type variable a becomes L[a]. In this situation, the two type variables are the same.

Note that cases in U-VII are not redundant to unify a type variable a with a type τ. A simple substitution (αl→τ) is not enough, because the τ may contain a locked type variable of the form L[β]. In this case, the current type checker must decide priority of the unification as described above.

It is to be understood, however, that even though numerous characteristics and advantages of the present invention have been set forth in the foregoing description, together with details of the structure and function of the invention, the disclosure is illustrative only, the full disclosure is attached in the appendix, and changes may be made in detail, especially in matters of shape, size and arrangement of parts within the principles of the invention to the full extent indicated by the broad general meaning of the terms in which the appended claims are expressed.

What is claimed is:

1. A system for detecting a run-time type error in a program prior to running the program whose source code being written in a programming language with imperative constructs and parametric polymorphic procedures, comprising:

an intermediate form translator for translating said source code including imperative constructs and the parametric polymorphic procedures into intermediate form representations;

type representations having predetermined types including a locking type constructor and an unlocking type constructor, said locking type constructors locking said predetermined types for defining predetermined locked types so as to ultimately prevent run-time type errors associated with mutuality in relation to said imperative constructs, said unlocking type constructors unlocking said predetermined locked types; and a type checker in response to said intermediate form representations and the type representations for checking whether said predetermined locked types are free of substitution with an exact type so that said program will be free of said run-time type error, said exact type excluding a type equal to and more general than said predetermined locked types.

2. The system for type checking according to claim 1 wherein said programming language includes at least ML and LISP.

3. The system for type checking according to claim 2 wherein said polymorphic procedures in said ML are used at least with any combination of constants, term variables, lambda-expressions, function applications and let expressions.

4. The system for type checking according to claim 1 wherein said mutuality includes a jumping operation with a value passing and a referencing operation.

5. The system for type checking according to claim 4 wherein said referencing operation further includes reference creation, dereferencing and assignment.

6. The system for type checking according to claim 1 wherein said predetermined types further include at least a base type, a type variable, a function type, and a reference type.

7. The system for type checking according to claim 6 wherein said intermediate form representations include expressions, said expressions further including sub-expressions.

8. The system for type checking according to claim 6 wherein said type checker determines a first type for each of said sub-expressions so as to determine a second type for said expression based upon a plurality of said first types.

9. The system for type checking according to claim 8 wherein a locked type is provided to a type in said sub-expression when a creation of a mutual object at run time in said sub-expression is detected prior to run time, said locked type being unlocked upon a detection of reference to said mutual object resulting in an unlocked type.

10. The system for type checking according to claim 9 wherein said mutual object includes a reference cell and a passing value for jumping to a predetermined location.

11. The system for type checking according to claim 9 wherein said reference includes dereferencing and a use of said passing value in said predetermined location.

12. The system for type checking according to claim 9 wherein said run-time type error being suspected when said type variable in said locked type defining a locked type variable is substituted with a specific type before resulting in said unlocked type.

13. The system for type checking according to claim 12 wherein said program is free of said run-time type error when none of said locked type variables is substituted with said specific type before resulting in said unlocked type.

14. The system for type checking according to claim 13 wherein said specific type excludes a type equal to and more general than said locked type variable.

15. The system for type checking according to claim 7 wherein said type checker further comparing:
   a first type checker in response to said intermediate form representations and said type representations for determining a first type for each of said sub-expressions so as to determine a second type for said expression based upon a plurality of said first types; and
   a second type checker in response to said intermediate form representations and said type representations for further determining if said expression will be free of said run-time type error.

16. The system for type checking according to claim 15 wherein said first type checker generates a symbol table including local variables and corresponding types.

17. The system for type checking according to claim 15 wherein a locked type is provided to a type in said sub-expression when a creation of a mutual object at run time in said sub-expression is detected prior to run time, said locked type being marked for unlocking upon a detection of reference to said mutual object.

18. The system for type checking according to claim 17 wherein said type variable in said locked type defines a locked type variable.

19. The system for type checking according to claim 18 wherein said first type checker determines a substitution for substituting said locked type variable of a binding expression of said let expression to a specific type, defining at least a part of a let expression typing rule.

20. The system for type checking according to claim 19 wherein said second type checker in response to said substitution in said first type checker further determines a first type of a local variable of said let expression and then a second type of a body of said let expression based upon said first type indicating that said let expression is free of said run-time type error.

21. The system for type checking according to claim 20 wherein said let expression typing rule further includes a fork operation and a close operation, a non-locked type variable consisting of none-locked occurrence of a partially locked type variable and not-locked type variable.

22. The system for type checking according to claim 21 wherein said fork operation replaces each of nonlocked occurrences of said type variables with a fresh type variable except for said non-locked type variable appearing in said symbol table.

23. The system for type checking according to claim 22 wherein said close operation lists said type variables that may be used for substituting to a specific type, said listed type variables excluding said non-locked type variable appearing in said symbol table, and locked type variables and locked occurrences of partially locked type variables in said first type of said local variable.

24. The system for type checking according to claim 23 wherein said close operation associates said type variable with said symbol table defining an associated locked type variable if said type variable is not yet associated, fully locked in said first type of said local variable and fully locked or not appearing in said symbol table.

25. The system for type checking according to claim 24 wherein said type variable has a priority for unification in relation a second type variable based upon said symbol table.

26. The system for type checking according to claim 25 wherein said second type checker returns said second type of said expression if none of said run-time type error is detected.

27. The system for type checking according to claim 26 wherein upon a detection of said unlocking constructor at the outer most position in said sub-expression's type, defining an unlocking typing rule.

28. The system for type checking according to claim 27 wherein said unlocking typing rule further includes an unlock operation, an Ufork operation and said close operation.

29. The system for type checking according to claim 28 wherein said unlock operation unlocks said marked type which results in an unlocked type.

30. The system for type checking according to claim 28 wherein said Ufork operation replaces each of said non-locked type variable that is associated with said symbol table with a fresh type variable.

31. The system for type checking according to claim 25 wherein said associated locked type variable is substituted to said second type variable when said second type variable appears in said symbol table, said unification is defined to be successfully completed.

32. The system for type checking according to claim 25 wherein said second type variable is substituted to said associated locked type variable when said symbol table lacks said second type variable, said unification is defined to be successfully completed.

33. A method of detecting a run-time type error in a program prior to running the program whose source code being written in a programming language with imperative constructs and parametric polymorphic procedures, comprising the steps of:
   a. providing type representations hating predetermined types including a locking type constructor and an unlocking type constructor, said locking type constructors locking said predetermined types for preventing run-time type error associated with mutuality in relation to said imperative constructs, said unlocking type constructors unlocking said predetermined locked types;

b. translating said source code including imperative constructs and the parametric polymorphic procedures into intermediate form representations; and c. determining in response to said intermediate form representations and said type representations whether said predetermined locked types are free of substitution with an exact type so that said program will be free of said run-time type error.

34. The method of type checking according to claim 33 wherein said programming language includes at least ML and LISP.

35. The method of type checking according to claim 34 wherein said polymorphic procedures in said ML are used at least with any combination of constants, term variables, lambda-expressions, function applications and let expressions.

36. The method of type checking according to claim 33 wherein said step c determines whether mutuality in relation to said imperative constricts in said program will be free of said run-time type error.

37. The method of type checking according to claim 36 wherein said mutuality includes a jumping operation with a value passing and a referencing operation.

38. The method of type checking according to claim 37 wherein said referencing operation further includes reference creation, dereferencing and assignment.

39. The method of type checking according to claim 33 wherein said predetermined types further include at least a base type, a type variable, a function type, and a reference type.

40. The method of type checking according to claim 39 wherein said intermediate form representations include expressions, said expressions further including sub-expressions.

41. The method of type checking according to claim 40 wherein said step c determines a first type for each of said sub-expressions so as to determine a second type for said expression based upon a plurality of said first types.

42. The method of type checking according to claim 41 wherein a locked type is provided to a type in said sub-expression when a creation of a mutual object at run time in said sub-expression is detected prior to run time, said locked type being unlocked upon a detection of reference to said mutual object resulting in an unlocked type.

43. The method of type checking according to claim 42 wherein said mutual object includes a reference cell and a passing value for jumping to a predetermined location.

44. The method of type checking according to claim 42 wherein said reference includes dereferencing and a use of said passing value in said predetermined location.

45. The method of type checking according to claim 42 wherein said run-time type error being suspected when said type variable in said locked type defining a locked type variable is substituted with a specific type before resulting in said unlocked type.

46. The method of type checking according to claim 45 wherein said program is free of said run-time type error when none of said locked type variables is substituted with said specific type before resulting in said unlocked type.

47. The method of type checking according to claim 46 wherein said specific type excludes a type equal to and more general than said locked type variable.

48. The method of type checking according to claim 40 wherein said step c further comprises the steps of:

d. determining a first type for each of said sub-expressions in response to said intermediate form representations and said type representations and then a second type for said expression based upon a plurality of said first types; and e. further determining in response to said intermediate form representations and said type representations whether if said expression will be free of said run-time type error.

49. The method of type checking according to claim 48 wherein said step d generates a symbol table including local variables and corresponding types.

50. The method of type checking according to claim 48 wherein a locked type is provided to a type in said sub-expression when a creation of a mutual object at run time in said sub-expression is detected prior to run time, said locked type being marked for unlocking upon a detection of reference to said mutual object.

51. The method of type checking according to claim 50 wherein said type variable in said locked type defines a locked type variable.

52. The method of type checking according to claim 51 wherein said step d determines a substitution for substituting said locked type variable of a binding expression of said let expression to a specific type, defining at least a part of a let expression typing rule.

53. The method of type checking according to claim 52 wherein said step e in response to said substitution in said first type checker further determines a first type of a local variable of said let expression and then a second type of a body of said let expression based upon said first type indicating that said let expression is free of said run-time type error.

54. The method of type checking according to claim 53 wherein said let expression typing rule further includes a fork operation and a close operation, a non-locked type variable consisting of none-locked occurrence of a partially locked type variable and not-locked type variable.

55. The method of type checking according to claim 54 wherein said fork operation replaces each of nonlocked occurrences of said type variables with a fresh type variable except for said non-locked type variable appearing in said symbol table.

56. The method of type checking according to claim 55 wherein said close operation lists said type variables that may be used for substituting to a specific type, said listed type variables excluding said non-locked type variable appearing in said symbol table, and locked type variables and locked occurrences of partially locked type variables in said first type of said local variable.

57. The method of type checking according to claim 56 wherein said close operation associates said type variable with said symbol table defining an associated locked type variable if said type variable is not yet associated, fully locked in said first type of said local variable and fully locked or not appearing in said symbol table.

58. The method of type checking according to claim 57 wherein said type variable has a priority for unification in relation a second type variable based upon said symbol table.

59. The method of type checking according to claim 58 wherein said step e returns said second type of said expression if none of said run-time type error is detected.

60. The method of type checking according to claim 59 wherein upon a detection of said unlocking constractor at the outer most position in said sub-expression's type, defining an unlocking typing rule.

61. The method of type checking according to claim 60 wherein said unlocking typing rule further includes an unlock operation, an Ufork operation and said close operation.

62. The method of type checking according to claim 61 wherein said unlock operation unlocks said marked type which results in an unlocked type.

63. The method of type checking according to claim 61 wherein said Ufork operation replaces each of said non-locked type variable that is associated with said symbol table with a fresh type variable.

64. The method of type checking according to claim 58 wherein said associated locked type variable is substituted to said second type variable when said second type variable appears in said symbol table, said unification is defined to be successfully completed.

65. The method of type checking according to claim 58 wherein said second type variable is substituted to said associated locked type variable when said symbol table lacks said second type variable, said unification is defined to be successfully completed.

* * * * *

UNITED STATES PATENT AND TRADEMARK OFFICE
CERTIFICATE OF CORRECTION

PATENT NO. : 5,748,966
DATED : May 5, 1998
INVENTOR(S) : Yoshikazu Sato

It is certified that error appears in the above-indentified patent and that said Letters Patent is hereby corrected as shown below:

Column 5, Line 12 - "1" should be typed as "!".

Column 5, Line 58 - "Defintiion" should be typed as "Definition."

Column 6, in first equation - "fp = addone;" should be typed as "fp: = addone;".

Column 8, Line 14 - "ifp" should be typed as "!fp."

Column 14, Line 53 - "vLock(tau$_1$)>Lock(tau$_2$)" should be typed as "Lock(tau$_1$)>Lock(tau$_2$)".

Column 14, Line 54 - A paragraph should be inserted after "ref.$^1$"

Column 14, Line 64 - "If" should be typed as "!."

Column 15, Line 2 - Second instance of "a" should actually be "α."

Column 16, Line 34 - "a" should actually be "α."

Column 16, Line 44 - "Wi" should be typed as "W1."

Column 17, Line 1 - First instance of "a" should actually be "α."

Column 17, Line 41 - "T$_1$" should be typed as "τ1".

UNITED STATES PATENT AND TRADEMARK OFFICE
CERTIFICATE OF CORRECTION

PATENT NO. : 5,748,966
DATED : May 5, 1998
INVENTOR(S) : Yoshikazu Sato

It is certified that error appears in the above-indentified patent and that said Letters Patent is hereby corrected as shown below:

Column 17, Line 47 - "*" should be omitted.

Column 18, Line 6 - "a" should actually be "$\alpha$."

Column 18, Line 10 - "L[a]" should be typed as "L[$\alpha$]."

Column 18, Line 11 - "L[a]" should be typed as "L[$\alpha$]."

Signed and Sealed this

Twenty-seventh Day of October, 1998

Attest:

BRUCE LEHMAN

*Attesting Officer*   *Commissioner of Patents and Trademarks*